(12) United States Patent
Chen et al.

(10) Patent No.: US 11,509,416 B1
(45) Date of Patent: Nov. 22, 2022

(54) DUPLICATE TRANSMISSIONS WITH CHANNEL PUNCTURING

(71) Applicant: QUALCOMM Incorporated, San Diego, CA (US)

(72) Inventors: Jialing Li Chen, San Diego, CA (US); Kanke Wu, San Diego, CA (US); Bin Tian, San Diego, CA (US); Youhan Kim, Saratoga, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/340,578

(22) Filed: Jun. 7, 2021

(51) Int. Cl.
*H04W 28/06* (2009.01)
*H04L 1/00* (2006.01)
*H04L 27/26* (2006.01)

(52) U.S. Cl.
CPC .......... *H04L 1/0011* (2013.01); *H04L 1/0069* (2013.01); *H04L 27/2602* (2013.01); *H04L 1/0013* (2013.01)

(58) Field of Classification Search
CPC ... H04L 1/0041; H04L 1/0075; H04L 1/0625; H04L 1/0045; H04L 27/2602; H04L 27/2603; H04L 1/004; H04L 27/18; H04L 27/34; H04L 1/1893; H04L 1/1819; H04L 1/1614; H04L 1/1816; H04L 1/1845; H04L 1/0008; H04L 69/08; H04L 5/0094; H04L 5/001; H04L 5/0044; H04L 2212/00; H04W 28/065; H04W 84/12; H04W 80/02; H04W 80/045
See application file for complete search history.

(56) References Cited

U.S. PATENT DOCUMENTS

2021/0127291 A1   4/2021  Chen et al.

FOREIGN PATENT DOCUMENTS

WO    WO-2021034155 A1    2/2021

OTHER PUBLICATIONS

"36. Extremely High Throughput (EHT) PHY Specification 36.1 Introduction 36.1.1 Introduction to the EHT PHY", TGBE_CL_36, IEEE-SA, Piscataway, NJ, USA, vol. 802.11be drafts, No. D0.3, Jan. 19, 2021, pp. 153-380, XP068183505.
International Search Report and Written Opinion—PCT/US2022/027813—ISA/EPO—dated Aug. 18, 2022.
Vermani S (Qualcomm)., et al., "Open Issues on Preamble Design", IEEE Draft, 11-20-1238-10-00BE-OPEN-ISSUES-ON-PREAMBLE-DESIGN, IEEE-SA Mentor, Piscataway, NJ USA, vol. 802.11 EHT, 802.11be, No. 10, Oct. 28, 2020, pp. 1-27, XP068174075.

*Primary Examiner* — Jung Liu
(74) *Attorney, Agent, or Firm* — Holland & Hart LLP

(57) ABSTRACT

This disclosure provides methods, devices and systems for increasing the transmit power of wireless communication devices operating on power spectral density (PSD)-limited wireless channels. Some implementations more specifically relate to tone mapping techniques and physical layer convergence protocol (PLCP) protocol data unit (PPDU) designs that support duplicate (or "DUP mode") transmissions with channel puncturing. In some implementations, a wireless communication device may transmit a PPDU carrying user data over a wireless channel excluding one or more punctured subchannels, where the user data is transmitted in a DUP mode. As such, the user data may be mapped to a number (N) of tones spanning a first portion of the wireless channel and a duplicate copy of the user data may be mapped to N tones spanning a second portion of the wireless channel.

32 Claims, 18 Drawing Sheets

DUPLICATE TRANSMISSIONS WITH CHANNEL PUNCTURING

TECHNICAL FIELD

This disclosure relates generally to wireless communication, and more specifically to duplicate transmissions with channel puncturing.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless communication devices may be capable of duplicate (or "DUP mode") transmissions. For example, an initial release of the IEEE 802.11be amendment of the IEEE 802.11 standard supports an Extremely High Throughput (EHT) DUP mode for single user transmissions. In the EHT DUP mode, user data is mapped to a first resource unit (RU) in accordance with a dual carrier modulation (DCM) scheme so that the first RU carries two copies of the user data, and a duplicate copy of the user data is mapped to a second RU in accordance with the DCM scheme so that the second RU also carries two copies of the user data. As a result, four copies of the user data are spread across the first and second RUs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include generating a physical layer (PHY) convergence protocol (PLCP) protocol data unit (PPDU) having a PHY preamble and a data portion that carries user data, where the PHY preamble includes a universal signal field (U-SIG) that carries bandwidth information indicating a bandwidth associated with the PPDU and carries punctured channel information indicating one or more punctured subchannels spanning a first portion of the bandwidth, and where the PHY preamble further carries duplicate transmission information indicating that the data portion is associated with a duplicate transmission.

In some aspects, the first portion of the bandwidth may overlap a subset of the N tones spanning the second portion of the bandwidth. In some implementations, the subset may include a respective range of tones spanned by each of the one or more punctured subchannels in addition to two tones immediately below, or three tones immediately above, each of the ranges. In some implementations, the N tones spanning the second portion of the bandwidth may represent a first resource unit (RU), in which the subset of tones overlapping the first portion of the bandwidth are not modulated for transmission over the wireless channel, and the N tones spanning the third portion of the bandwidth may represent a second RU, where the user data is mapped to the first RU in accordance with a dual carrier modulation (DCM) scheme and the first duplicate copy of the user data is mapped to the second RU in accordance with the DCM scheme.

In some other aspects, the first portion of the bandwidth may not overlap any of the second or third portions of the bandwidth. In some implementations, the N tones spanning the second portion of the bandwidth may represent a first RU or multiple-RU (MRU) and the N tones spanning the third portion of the bandwidth may represent a second RU or MRU, where the user data is mapped to the first RU or MRU in accordance with a DCM scheme and the first duplicate copy of the user data is mapped to the second RU or MRU in accordance with the DCM scheme.

In some other implementations, the N tones spanning the second portion of the bandwidth may represent a first RU and the N tones spanning the third portion of the bandwidth may represent a second RU. In such implementations, the method may further include mapping a second duplicate copy of the user data to N tones spanning a third RU that does not overlap the first portion of the bandwidth or any of the first or second RUs. In some implementations, the user data may be mapped to the first RU in accordance with a DCM scheme and the first and second duplicate copies of the user data may be mapped to the second and third RUs, respectively, in accordance with the DCM scheme.

In some implementations, the method may include mapping a third duplicate copy of the user data to N tones spanning a fourth RU that does not overlap the first portion of the bandwidth or any of the first, second, or third RUs; and mapping a fourth duplicate copy of the user data to N tones spanning a fifth RU that does not overlap the first portion of the bandwidth or any of the first, second, third, or fourth RUs. In some implementations, the user data may be mapped to the first RU in accordance with a DCM scheme and the first, second, third, and fourth duplicate copies of the user data may be mapped to the second, third, fourth, and fifth RUs, respectively, in accordance with the DCM scheme.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including generating a PPDU having a PHY preamble and a data portion that carries user data, where the PHY preamble includes a U-SIG that carries bandwidth information indicating a bandwidth associated with the PPDU and carries punctured channel information indicating one or more punctured subchannels spanning a first portion of the bandwidth, and where the PHY preamble further carries duplicate transmission information indicating that the data portion is associated with a duplicate transmission.

Another innovative aspect of the subject matter described in this disclosure can be implemented as a method of wireless communication. The method may be performed by a wireless communication device, and may include receiving a PPDU having a PHY preamble and a data portion that carries user data, where the PHY preamble includes a U-SIG that carries bandwidth information indicating a bandwidth associated with the PPDU and carries punctured channel information indicating one or more punctured subchannels spanning a first portion of the bandwidth, and where the PHY preamble further carries duplicate transmission information indicating that the data portion is associated with a duplicate transmission; demapping the user data from a number (N) of tones spanning a second portion of the bandwidth based on the punctured channel information; and demapping a first duplicate copy of the user data from N tones spanning a third portion of the bandwidth, which does not overlap the second portion, based on the punctured channel information.

In some aspects, the first portion of the bandwidth may overlap a subset of the N tones spanning the second portion of the bandwidth. In some implementations, the subset may include a respective range of tones spanned by each of the one or more punctured subchannels in addition to two tones immediately below, or three tones immediately above, each of the ranges. In some implementations, the N tones spanning the second portion of the bandwidth may represent a first RU and the N tones spanning the third portion of the bandwidth may represent a second RU, where the user data is demapped from the first RU in accordance with a DCM scheme and the first duplicate copy of the user data is demapped from the second RU in accordance with the DCM scheme. In some implementations, the demapping of the user data from the N tones spanning the second portion of the bandwidth may include calculating log-likelihood ratios (LLRs) for each bit of the user data received on the N tones, where the LLRs associated with each tone in the subset of tones overlapping the first portion of the bandwidth are assigned a value equal to zero.

In some other aspects, the first portion of the bandwidth may not overlap any of the second or third portions of the bandwidth. In some implementations, the N tones spanning the second portion of the bandwidth may represent a first RU or MRU and the N tones spanning the third portion of the bandwidth may represent a second RU or MRU, where the user data is demapped from the first RU or MRU in accordance with a DCM scheme and the first duplicate copy of the user data is demapped from the second RU or MRU in accordance with the DCM scheme.

In some other implementations, the N tones spanning the second portion of the bandwidth may represent a first RU and the N tones spanning the third portion of the bandwidth may represent a second RU. In such implementations, the method may further include demapping a second duplicate copy of the user data from N tones spanning a third RU that does not overlap the first portion of the bandwidth or any of the first or second RUs. In some implementations, the user data may be demapped from the first RU in accordance with a DCM scheme and the first and second duplicate copies of the user data may be demapped from the second and third RUs, respectively, in accordance with the DCM scheme.

In some implementations, the method may further include demapping a third duplicate copy of the user data from N tones spanning a fourth RU that does not overlap the first portion of the bandwidth or any of the first, second, or third RUs; and demapping a fourth duplicate copy of the user data from N tones spanning a fifth RU that does not overlap the first portion of the bandwidth or any of the first, second, third, or fourth RUs. In some implementations, the user data may be demapped from the first RU in accordance with a DCM scheme and the first, second, third, and fourth duplicate copies of the user data may be demapped from the second, third, fourth, and fifth RUs, respectively, in accordance with the DCM scheme.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a PPDU having a PHY preamble and a data portion that carries user data, where the PHY preamble includes a U-SIG that carries bandwidth information indicating a bandwidth associated with the PPDU and carries punctured channel information indicating one or more punctured subchannels spanning a first portion of the bandwidth, and where the PHY preamble further carries duplicate transmission information indicating that the data portion is associated with a duplicate transmission; demapping the user data from a number (N) of tones spanning a second portion of the bandwidth based on the punctured channel information; and demapping a first duplicate copy of the user data from N tones spanning a third portion of the bandwidth, which does not overlap the second portion, based on the punctured channel information.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
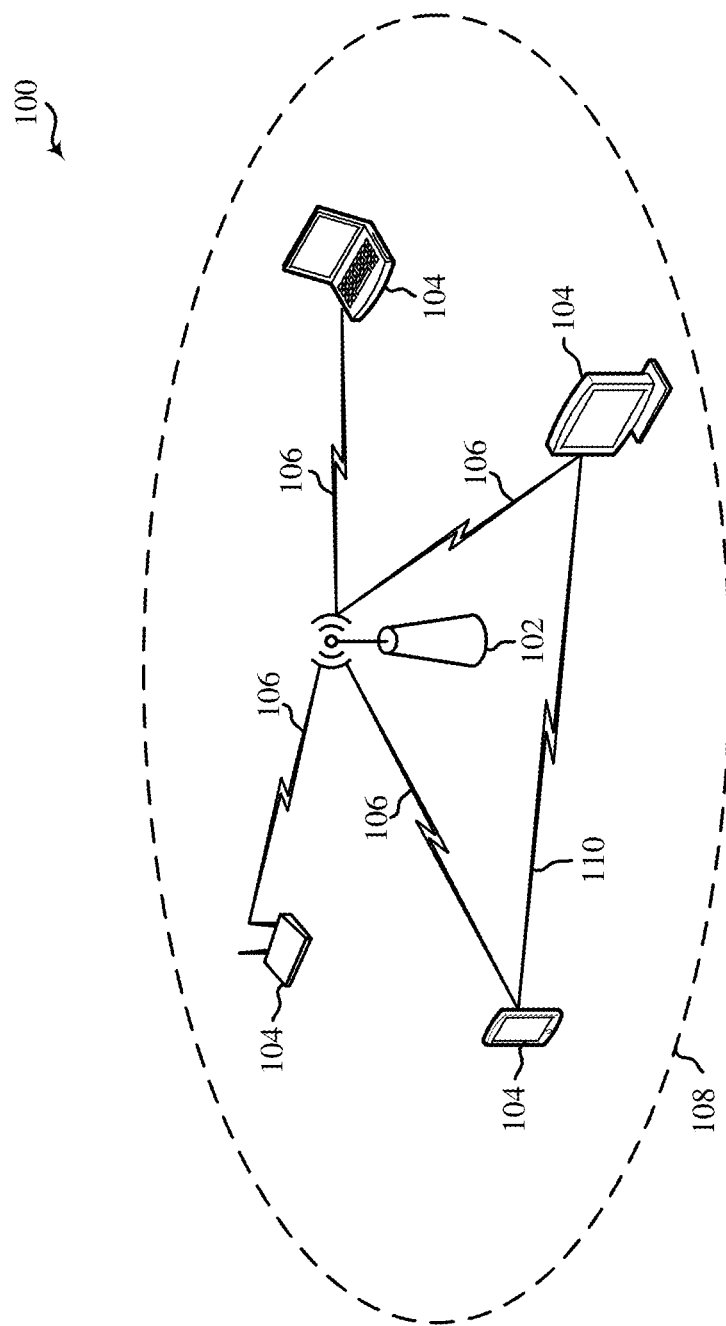
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to duplicate transmissions, and more particularly, to tone mapping techniques and physical layer convergence protocol (PLCP) protocol data unit (PPDU) designs that support duplicate transmissions with channel puncturing. In some implementations, a wireless communication device may transmit a PPDU carrying user data over a wireless channel excluding one or more punctured subchannels, where the user data is transmitted in a DUP mode. As such, the user data may be mapped to a number (N) of tones spanning a first portion of the wireless channel and a duplicate copy of the user data may be mapped to N tones spanning a second portion of the wireless channel. In some aspects, the user data may be mapped to each of the first and second portions of the wireless channel in accordance with a DCM scheme. As a result of DCM, 4 copies of the user data are spread across the first and second portions of the wireless channel. In some implementations, the punctured subchannels may overlap a subset of the N tones spanning the first portion of the wireless channel. In such implementations, the N tones spanning the first portion of the wireless channel may represent a first resource unit (RU) transmitted with puncturing (also referred to as a "punctured RU") and the N tones spanning the second portion of the wireless channel may represent a second RU transmitted without puncturing. In the punctured RU, the subset of tones overlapping the punctured subchannels (also referred to as "punctured tones") are not modulated for transmission over the wireless channel. As such, a receiving device may not receive a copy of the portion of the user data that maps to the punctured tones.

In some other implementations, the punctured subchannels may not overlap any of the first or second portions of the wireless channel. In such implementations, the N tones spanning the first portion of the wireless channel may represent a first RU or multiple-RU (MRU) transmitted without puncturing and the N tones spanning the second portion of the wireless channel may represent a second RU or MRU transmitted without puncturing. In some aspects, the user data (or copies thereof) may be mapped to three or more RUs. In some implementations, the user data may be mapped to the three or more RUs in accordance with a DCM scheme. In such implementations, 6 or more copies of the user data may be spread across the three or more RUs. In some other implementations, the user data may be mapped to the three or more RUs without DCM. In such implementations, 3 or more copies of the user data may be spread across the three or more RUs.

Particular implementations of the subject matter described in this disclosure can be implemented to realize one or more of the following potential advantages. Duplicate transmissions provide greater flexibility in medium utilization, particularly in power spectral density (PSD)-limited wireless channels. By duplicating user data across multiple RUs transmitted in a PPDU, aspects of the present disclosure may increase the overall transmit power of the PPDU without exceeding the PSD limits of the wireless channel. In the present implementations, RU duplication (with or without DCM) allows 3 or more copies of the same user data to be transmitted concurrently over a wireless channel, resulting in a 3× (or greater) increase in transmit power. For example, the duplicate transmissions can be combined at the receiving device to achieve a 3× (or greater) gain in signal-to-interference-plus-noise ratio (SINR) for the data portion of the PPDU. Such increases in SINR can help overcome greater pathloss and thus increase the effective range of wireless communications on PSD-limited wireless channels. By adding support for channel puncturing, aspects of the present disclosure may extend duplicate transmissions to wider bandwidths that include one or more busy subchannels. As a result, such duplicate transmissions can more effectively harvest the available spectrum to achieve increased gains in SINR.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
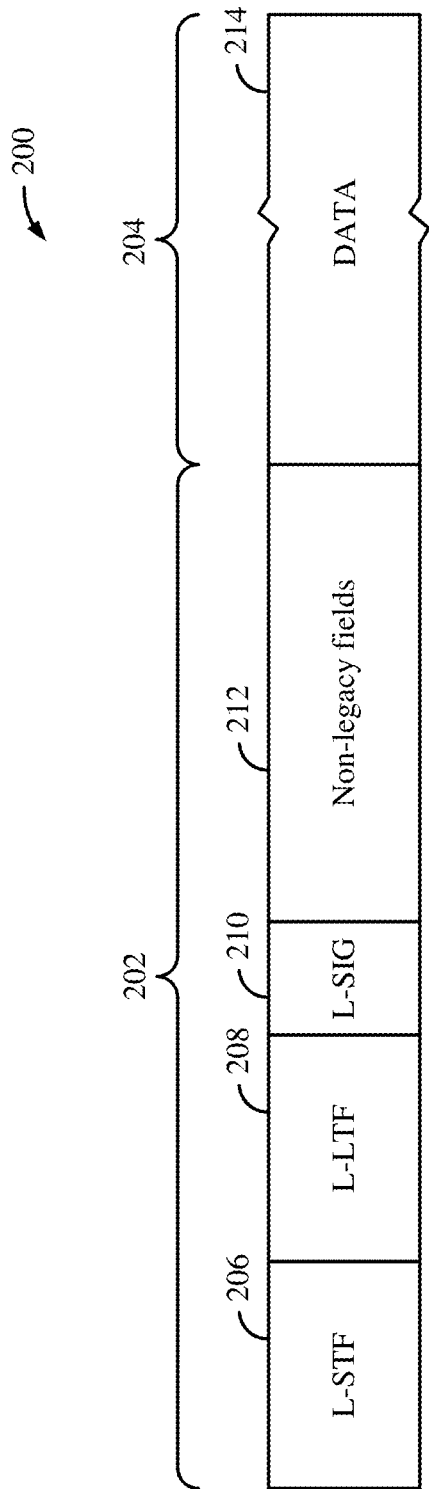
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
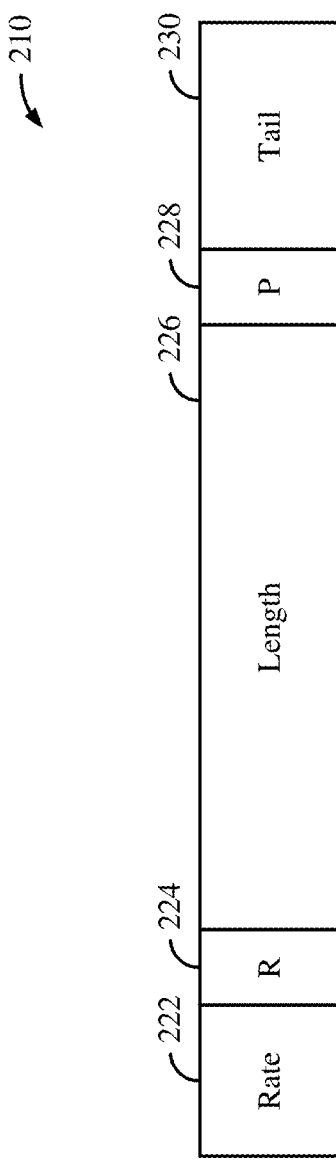
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
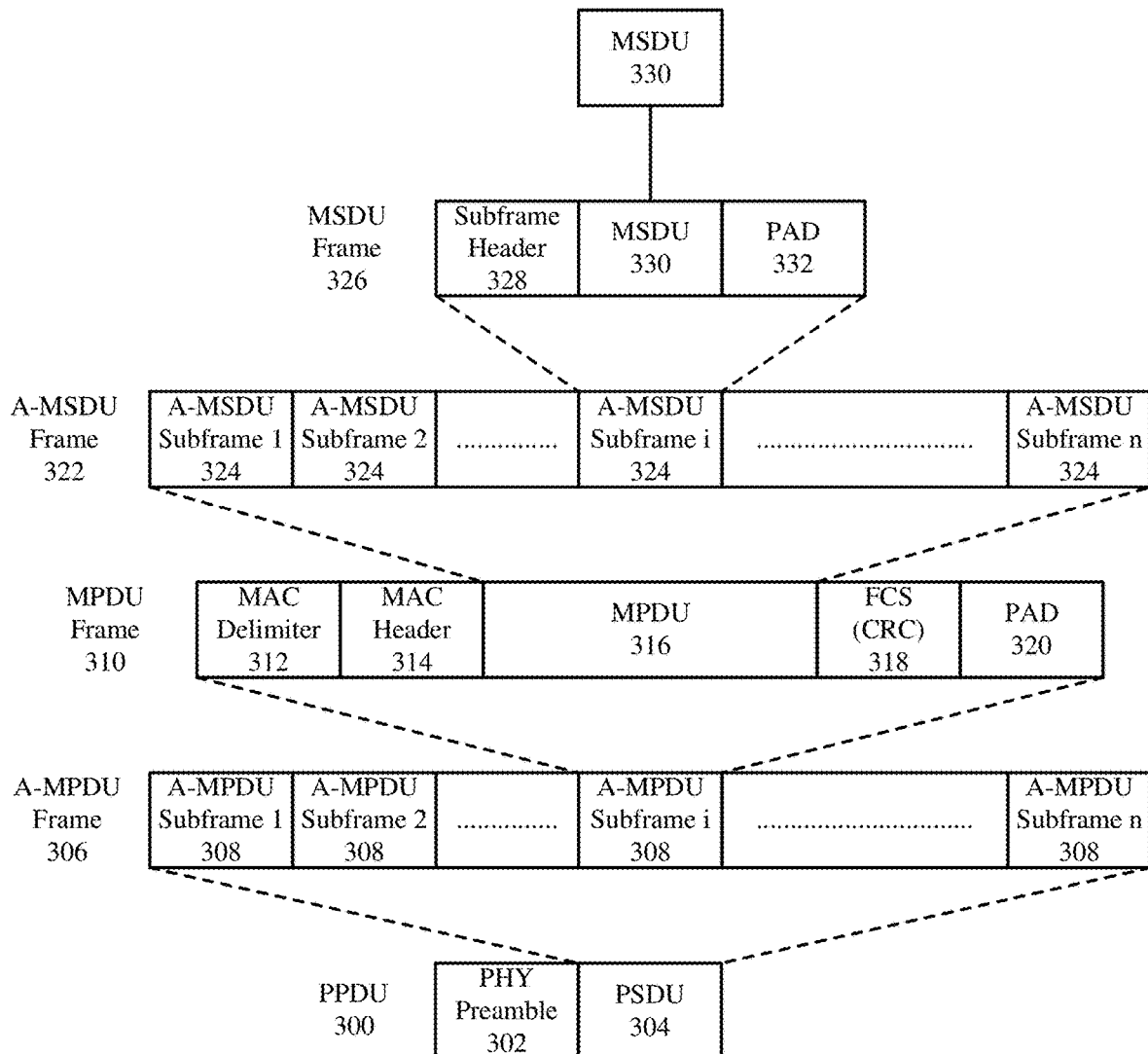
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimeter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
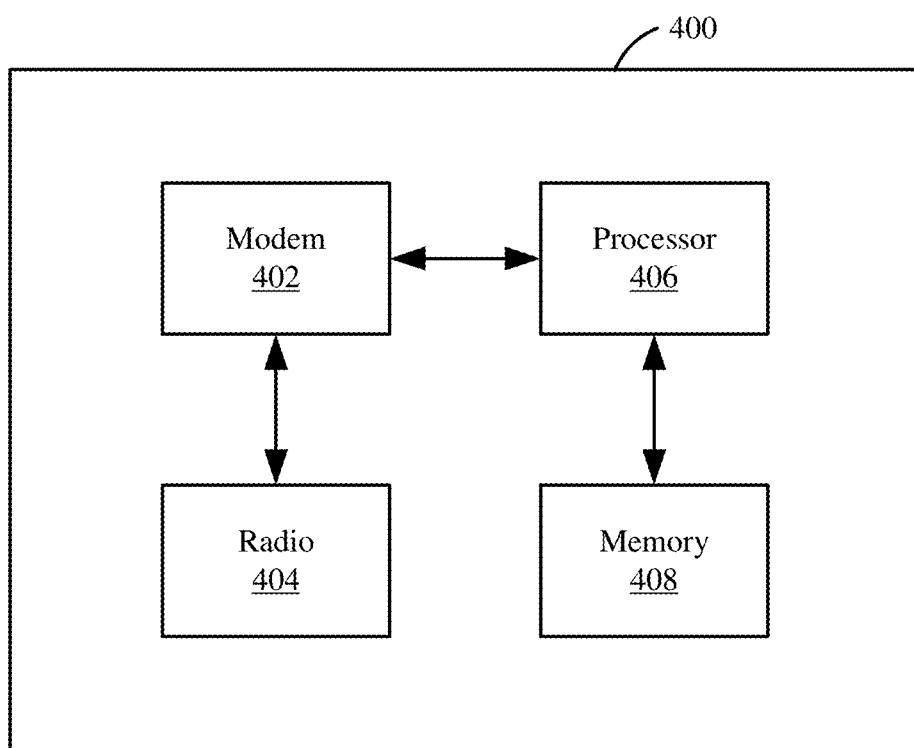
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
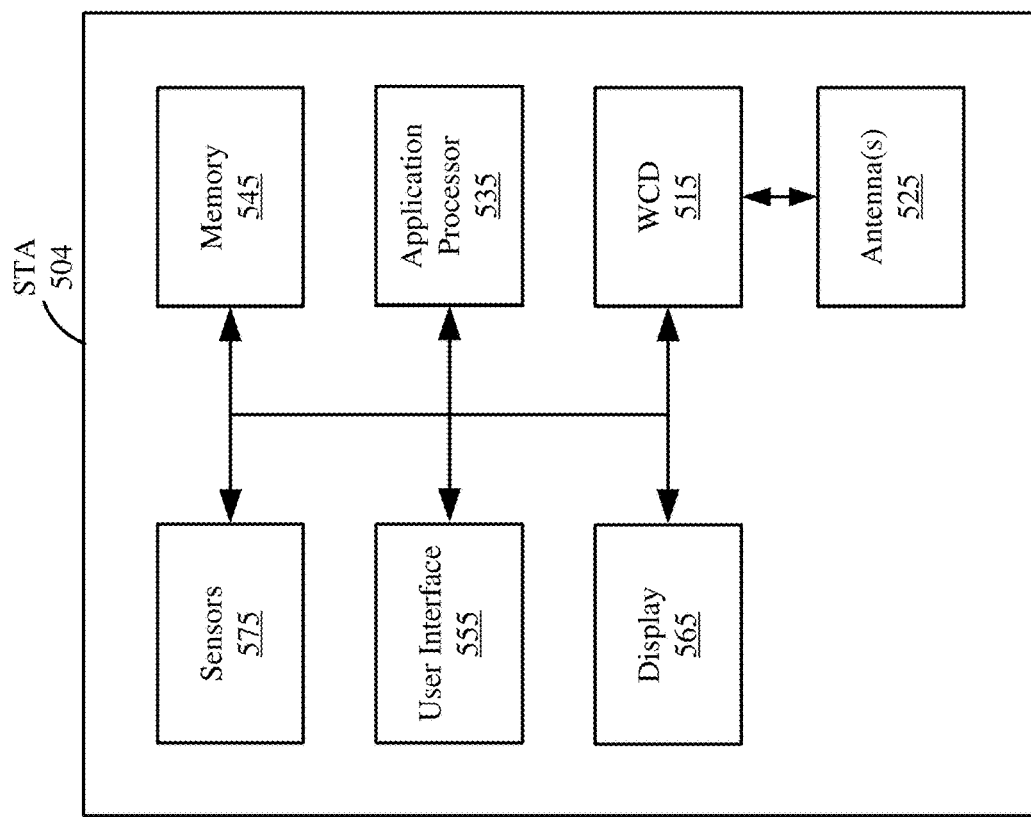
FIG. 5B shows a block diagram of an example STA.
Figure 5A:
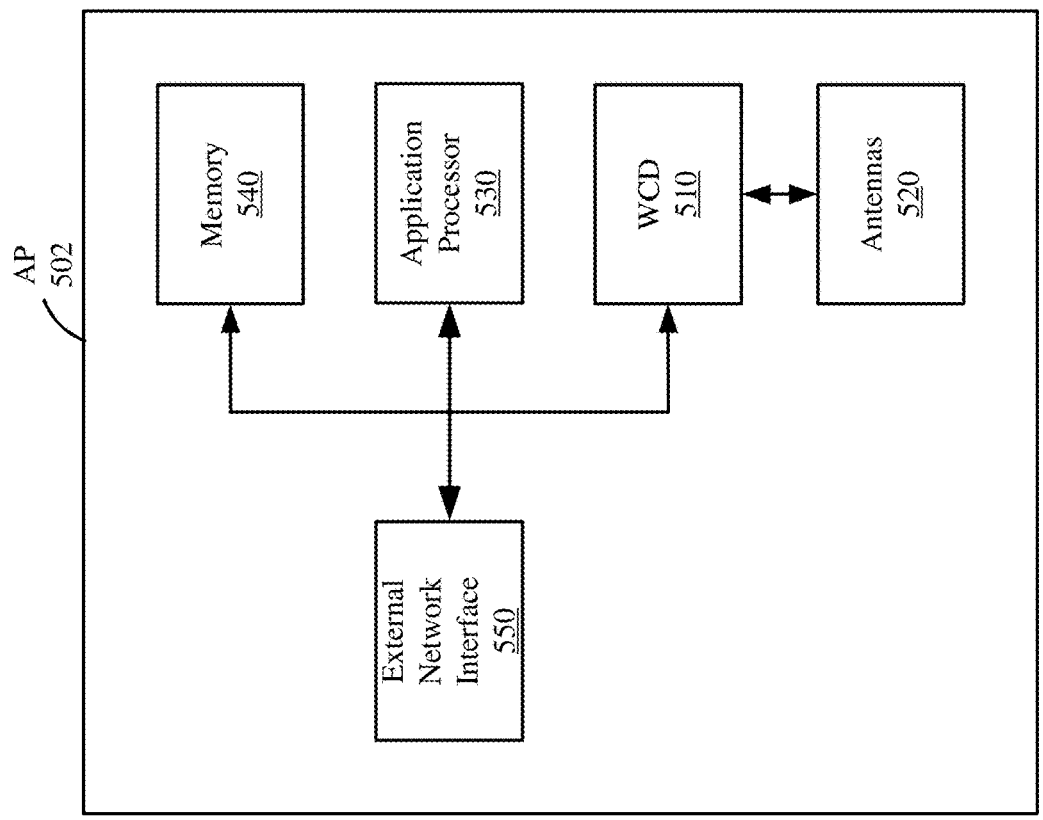
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510

(although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Figure 6:
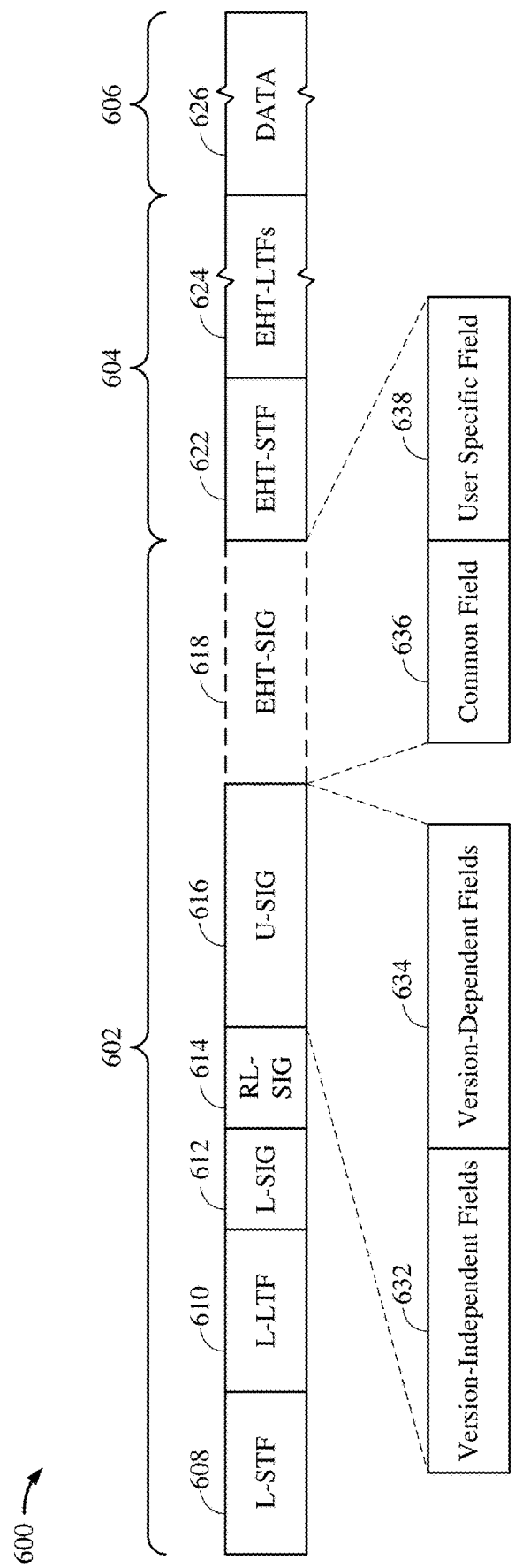
FIG. 6 shows an example PPDU usable for communications between an AP and a number of STAs according to some implementations.

FIG. 6 shows an example PPDU 600 usable for wireless communication between an AP and a number of STAs according to some implementations. The PPDU 600 includes a PHY preamble including a first portion 602 and a second portion 604. The PPDU 600 may further include a PHY payload 606 after the preamble, for example, in the form of a PSDU carrying a data field 626. In some implementations, the PPDU 600 may be formatted as a non-legacy or Extremely High Throughput (EHT) PPDU.

The first portion 602 of the PHY preamble includes L-STF 608, L-LTF 610, L-SIG 612, a repeated legacy signal field (RL-SIG) 614, and a universal signal field (U-SIG) 616. In some implementations, the first portion 602 of the PHY preamble may further include a non-legacy signal field (EHT-SIG) 618. With reference for example to the IEEE 802.11be amendment of the IEEE 802.11 standard, the first portion 602 may be referred to as a "pre-EHT modulated portion" of the PHY preamble. The second portion 604 of the PHY preamble includes a non-legacy short training field (EHT-STF) 622 and a number of non-legacy long training fields (EHT-LTFs) 624. With reference for example to the IEEE 802.11be amendment of the IEEE 802.11 standard, the second portion 604 may be referred to as the "EHT modulated portion" of the PHY preamble.

In some implementations, U-SIG 616 may include signaling regarding types or formats of additional signal fields that may follow U-SIG 616. Such signaling may be carried in one or more version-independent fields 632 and one or more version-dependent fields 634. The version-independent fields 632 may include, for example, a version identifier subfield and a bandwidth subfield. The version identifier subfield carries information indicating a version of the associated wireless communication protocol (starting from the IEEE 802.11be amendment and beyond). The bandwidth subfield carries information indicating a bandwidth associated with the PPDU 600 (such as from 20 MHz to 320 MHz).

The version-dependent fields 634 may carry information used for interpreting other fields of U-SIG 616 or EHT-SIG 618. Example version-dependent fields 634 may include a PPDU type and compression mode subfield and a punctured channel indication subfield. The PPDU type and compression mode subfield carries information indicating a general PPDU format and compression mode for the PPDU 600 (such as an EHT trigger-based (TB) PPDU format, an EHT multi-user (MU) PPDU format for DL OFDMA transmission, an EHT MU PPDU format for transmission to a single user or for transmission of a null data packet (NDP), or an EHT MU PPDU format for DL non-OFDMA MU-MIMO transmission). The punctured channel indication subfield carries information indicating one or more punctured subchannels associated with the bandwidth indicated by the bandwidth subfield. The punctured subchannels span a portion of the bandwidth on which the PPDU 600 is not transmitted.

EHT-SIG 618 may include a common field 636 and a user specific field 638. The common field 636 may include U-SIG overflow representing one or more bits or fields overflowed from U-SIG 616 or an RU allocation subfield carrying information indicating an allocation of RUs for intended recipients of the PPDU 600. The user specific field 638 may include a number of user fields carrying per-user information for intended recipients of the PPDU 600. The contents and availability of EHT-SIG 618 may depend on the format of the PPDU 600. For example, EHT-SIG 618 may be present in the EHT MU PPDU format, but absent in the EHT TB PPDU format.

As described above, some wireless communication devices may be capable of duplicate (or "DUP mode") transmissions. For example, an initial release of the IEEE 802.11be amendment of the IEEE 802.11 standard supports an EHT DUP mode for single user transmissions. In the EHT DUP mode, user data is mapped to a first RU in accordance with a DCM scheme so that the first RU carries two copies of the user data, and a duplicate copy of the user data is mapped to a second RU in accordance with the DCM scheme so that the second RU also carries two copies of the user data. As a result, four copies of the user data are spread across the first and second RUs.

Various aspects relate generally to duplicate transmissions, and more particularly, to tone mapping techniques and PPDU designs that support duplicate transmissions with channel puncturing. In some implementations, a wireless communication device may transmit a PPDU carrying user data over a wireless channel excluding one or more punctured subchannels, where the user data is transmitted in a DUP mode. As such, the user data may be mapped to a number (N) of tones spanning a first portion of the wireless channel and a duplicate copy of the user data may be mapped to N tones spanning a second portion of the wireless channel. In some aspects, the user data may be mapped to each of the first and second portions of the wireless channel in accordance with a DCM scheme. As a result of DCM, 4 copies of the user data are spread across the first and second portions of the wireless channel. In some implementations, the punctured subchannels may overlap a subset of the N tones spanning the first portion of the wireless channel. In such implementations, the N tones spanning the first portion of the wireless channel may represent a first RU transmitted with puncturing (also referred to as a "punctured RU") and the N tones spanning the second portion of the wireless channel may represent a second RU transmitted without puncturing. In the punctured RU, the subset of tones overlapping the punctured subchannels (also referred to as "punctured tones") are not modulated for transmission over the wireless channel. As such, a receiving device may not receive a copy of the portion of the user data that maps to the punctured tones.

In some other implementations, the punctured subchannels may not overlap any of the first or second portions of the wireless channel. In such implementations, the N tones spanning the first portion of the wireless channel may represent a first RU or MRU transmitted without puncturing and the N tones spanning the second portion of the wireless channel may represent a second RU or MRU transmitted without puncturing. In some aspects, the user data (or copies thereof) may be mapped to three or more RUs. In some implementations, the user data may be mapped to the three or more RUs in accordance with a DCM scheme. In such implementations, 6 or more copies of the user data may be spread across the three or more RUs. In some other implementations, the user data may be mapped to the three or more RUs without DCM. In such implementations, 3 or more copies of the user data may be spread across the three or more RUs Particular implementations of the subject matter described in this disclosure can be implemented to realize one or more of the following potential advantages. Duplicate transmissions provide greater flexibility in medium utilization, particularly in PSD-limited wireless channels. By duplicating user data across multiple RUs transmitted in a PPDU, aspects of the present disclosure may increase the overall transmit power of the PPDU without exceeding the PSD limits of the wireless channel. In the present implementations, RU duplication (with or without DCM) allows 3 or more copies of the same user data to be transmitted concurrently over a wireless channel, resulting in a 3× (or greater) increase in transmit power. For example, the duplicate transmissions can be combined at the receiving device to achieve a 3× (or greater) gain in signal-to-interference-plus-noise ratio (SINR) for the data portion of the PPDU. Such increases in SINR can help overcome greater pathloss and thus increase the effective range of wireless communications on PSD-limited wireless channels. By adding support for channel puncturing, aspects of the present disclosure may extend duplicate transmissions to wider bandwidths that include one or more busy subchannels. As a result, such duplicate transmissions can more effectively harvest the available spectrum to achieve increased gains in SINR.

Figure 7:
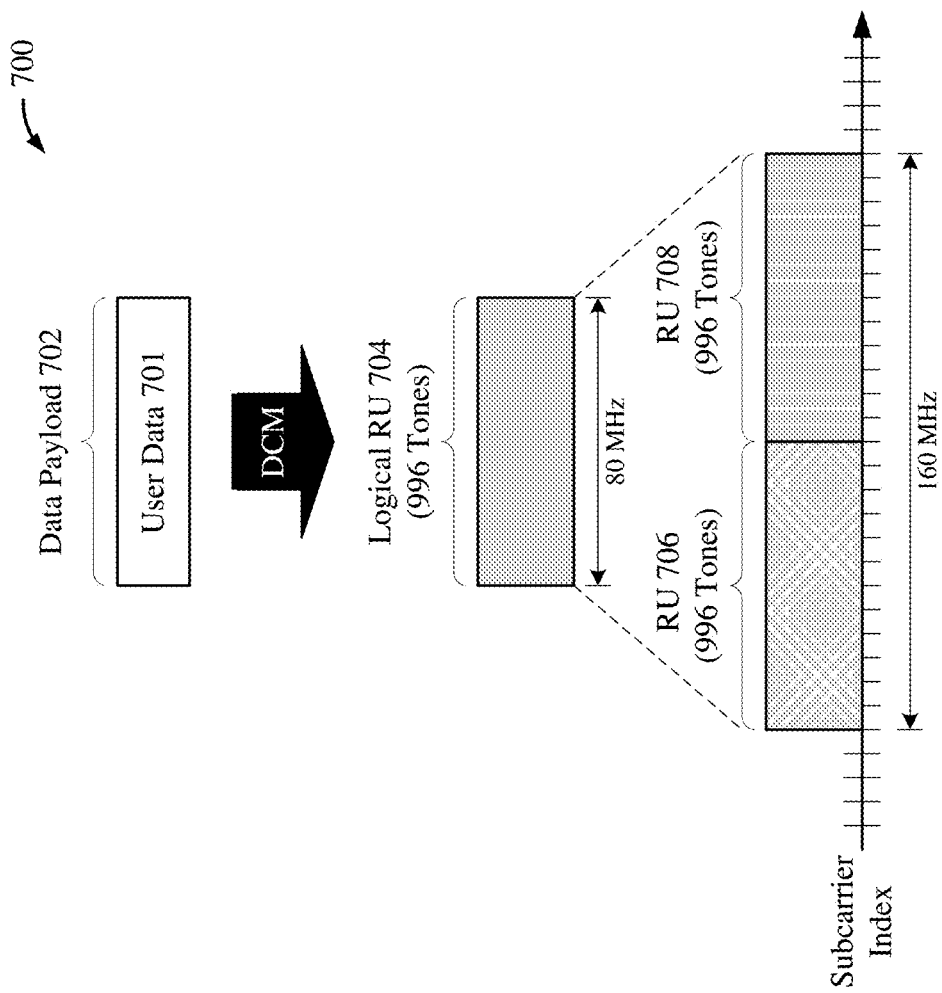
FIG. 7 shows a frequency diagram depicting an example duplicate tone mapping according to some implementations.

FIG. 7 shows a frequency diagram 700 depicting an example duplicate tone mapping according to some implementations. More specifically, FIG. 7 shows an example mapping of a data payload 702 to a set of tones or subcarriers for transmission over a wireless channel. In some implementations, the data payload 702 may be one example of the data field 626 of the PPDU 600 depicted in FIG. 6. In the example of FIG. 7, the data payload 702 includes user data 701 intended for a single user.

The user data 701 is mapped to a logical RU 704 in accordance with a DCM scheme. The logical RU 704 represents a number of tones that are allocated for the transmission of the user data 701. In the example of FIG. 7, the logical RU 704 includes 996 tones (spanning an 80 MHz bandwidth). However, in actual implementations, the logical RU 704 may include any suitable number of tones. DCM is a modulation technique that encodes the same user data 701 on two tones or subcarriers of the logical RU 704. More specifically, tones that carry the same user data 701 are separated by a fixed bandwidth to achieve frequency diversity and reduce channel fading. For example, a BPSK-DCM mapper can be used to map the user data 701 to a lower portion of the logical RU 704, and to map the same user data 701 to an upper portion of the logical RU 704, in accordance with a BPSK modulation scheme. As a result, the logical RU 704 includes two copies of the user data 701.

The logical RU 704 is further mapped to a pair of physical RUs 706 and 708. The physical RUs 706 and 708 represent the physical resources (identified by subcarrier indices) that are modulated to transmit the user data. In a duplicate transmission, the logical RU 704 is duplicated across the pair of physical RUs 706 and 708. For example, the logical RU 704 may be mapped to a number (N) of subcarrier indices spanning the first RU 706 and also mapped to N subcarrier indices spanning the second RU 708. As a result, the first RU 706 carries the same information as the second RU 708. Because the information in the logical RU 704 is mapped to each of the physical RUs 706 and 708, the user data 701 is effectively transmitted 4 times (in the frequency domain) on 2N subcarrier indices spanning the bandwidth of the RUs 706 and 708. Each of the physical RUs 706 and 708 is equal in size to the logical RU 704 (N=996). Thus, in the example of FIG. 7, the physical RUs 706 and 708 are transmitted on a 160 MHz-wide channel.

A transmitting device (such as an AP) may include a duplicate transmission mapper that maps the logical RU 704 to the physical RUs 706 and 708 in the frequency domain (such as described with reference to FIG. 7). The physical RUs 706 and 708 are further converted to a time-domain signal (such as by an inverse fast Fourier transform (IFFT)) for transmission over a wireless channel. A receiving device (such as a STA) receives the time-domain signal over the wireless channel and converts the time-domain signal back to the physical RUs 706 and 708 in the frequency domain (such as by a fast Fourier transform (FFT)). The receiving device may further include a duplicate transmission demapper that demaps the physical RUs 706 and 708 to the logical RU 704. In other words, the duplicate transmission demapper reverses the mapping performed by the duplicate transmission mapper at the transmitting device. The receiving device can then recover the user data 701 carried (or modulated) on the logical RU 704 as a result of the demapping.

To reduce the peak-to-average power ratio (PAPR) of the duplicate transmission, the transmitting device may apply a respective phase rotation (in the frequency domain) to each copy of the user data 701. For example, the transmitting device may apply a 4-part phase rotation [a(1), a(2), a(3), a(4)] to the frequency-domain signal [x, $x_{DCM}$, x, $x_{DCM}$], where x is the frequency-domain signal representing the original user data 701 (prior to DCM-encoding) which is associated with $N_{SD}$ tones or subcarriers and [x, $x_{DCM}$] is the DCM-encoded frequency-domain signal carried (or modulated) on the logical RU 704 (which then becomes data for $2N_{SD}$ tones and subcarriers and mapped to each of the RUs 706 and 708 (where $x_{DCM}(k)=(-1)^{k+N_{SD}}*x(k)$, x(k) and $x_{DCM}(k)$ are the k-th elements (on the k-th logical tone) of x and $x_{DCM}$, respectively, and k=[0, 1, . . . , $N_{SD}-1$]). Thus, the resulting phase-rotated signal (y) can be expressed according to Equation 1:

$$y=[a(1)x, a(2)x_{DCM}, a(3)x, a(4)x_{DCM}] \quad (1)$$

By setting a(1)=1, the remaining phase rotations a(2), a(3), and a(4) can be set to any combination of 1 or −1 to reduce the PAPR of the signal y. In some aspects, the 4-part phase rotation can equal to [1, 1, −1, 1].

By transmitting 4 copies of the user data 701, concurrently, in the data payload 702 of a single PPDU, the transmitting device can effectively boost its overall transmit power by 4×. For example, some wireless channels (such as in the 6 GHz frequency band) impose PSD limits on the transmit power of an AP or STA for a given frequency bandwidth (such as per MHz). However, by spreading multiple copies of the user data 701 across a wider bandwidth (such as by increasing the bandwidth from 40 MHz to 80 MHz), the duplicate transmission techniques can increase the overall transmit power of the user data 701 without exceeding the PSD limits of the wireless channel. For example, the duplicate transmissions can be combined at the receiving device to achieve a 4× gain in SINR for the data payload 702. In the example of FIG. 7, the data payload 702 is shown to include user data 701 for a single user.

An initial release of the IEEE 802.11be amendment supports duplicate transmissions to a single user (referred to as an "EHT DUP mode"). More specifically, the EHT DUP mode leverages the EHT MU PPDU packet format for transmission to a single user. To signal the EHT DUP mode, the PPDU type and compression mode subfield of U-SIG may be set to 1 (to indicate an EHT transmission to a single user) and the MCS subfield of the user field in EHT-SIG may be set to indicate EHT-MCS14. Aspects of the present disclosure recognize that the EHT DUP mode can only be used with 80 MHz, 160 MHz, or 320 MHz bandwidths without channel puncturing. Thus, if any subchannel of an 80 MHz bandwidth is busy, a PPDU cannot be transmitted in the EHT DUP mode; if any subchannel of a 160 MHz bandwidth is busy, a PPDU can only be transmitted in the EHT DUP mode over an 80 MHz sub-band that does not include any punctured subchannels; and if any subchannel of a 320 MHz bandwidth is busy, a PPDU can only be transmitted in the EHT DUP mode over a 160 MHz sub-band that does not include any punctured subchannels. As such, busy channel conditions may severely limit the bandwidth of a PPDU transmitted in the EHT DUP mode.

Figure 8:
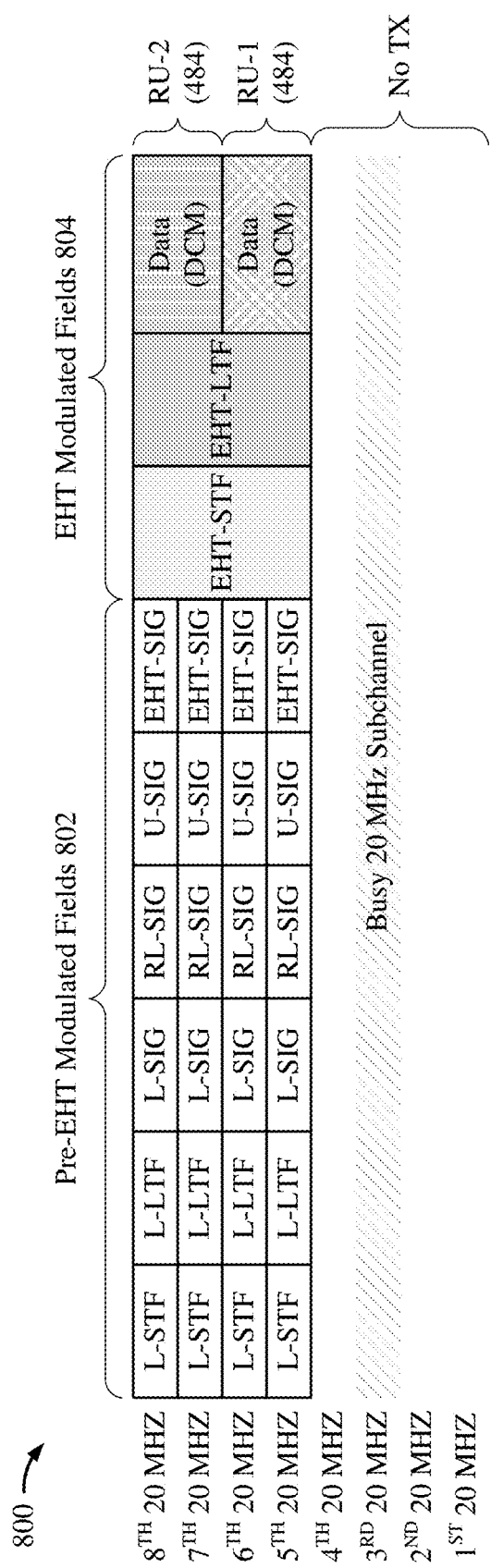
FIG. 8 shows an example frame structure of a PPDU configured for duplicate transmission over a wireless channel.

FIG. 8 shows an example frame structure of a PPDU 800 configured for duplicate transmission over a wireless channel. In some implementations, the PPDU 800 may be one example of the PPDU 600 of FIG. 6. More specifically, the PPDU 800 may conform to the EHT MU PPDU format for transmission to a single user in the EHT DUP mode defined by an initial release of the IEEE 802.11be amendment of the IEEE 802.11 standard. In the example of FIG. 8, a transmitting device may be capable of transmitting the PPDU 800 over a 160 MHz bandwidth. However, as shown in FIG. 8, the $3^{rd}$ 20 MHz subchannel of the 160 MHz bandwidth is busy. As a result, the PPDU 800 can only be transmitted on the upper 80 MHz sub-band of the 160 MHz bandwidth (spanning the $5^{th}$, $6^{th}$, $7^{th}$, and $8^{th}$ 20 MHz subchannels).

The PPDU 800 includes a number of pre-EHT modulated fields 802 and a number of EHT modulated fields 804. The pre-EHT modulated fields 802 include L-STF, L-LTF, L-SIG, RL-SIG, U-SIG, and EHT-SIG, which represent a first portion of a PHY preamble of the PPDU 800. In the example of FIG. 8, L-STF, L-LTF, L-SIG, RL-SIG, U-SIG, and EHT-SIG are duplicated in each 20 MHz subchannel spanning the entirety of the PPDU bandwidth. However, the subfields or values of U-SIG may vary per 80 MHz sub-band. The EHT modulated fields 804 include EHT-STF and EHT-LTF, which represent a second portion of the PHY preamble, as well as a data portion of the PPDU 800.

Because the data portion of the PPDU 800 is transmitted in the EHT DUP mode, the PPDU type and compression mode subfield of U-SIG may be set to 1 (to indicate an EHT transmission to a single user) and the MCS subfield of the user field in EHT-SIG may be set to indicate EHT-MCS14. As such, the user data in the data portion of the PPDU 800 may be mapped, in accordance with a DCM scheme, to a 484-tone RU in a first 40 MHz subchannel (RU-1) and a duplicate copy of the user data may be mapped, in accordance with the DCM scheme, to a second 484-tone RU in a second 40 MHz subchannel (RU-2). As a result of the mapping, 4 copies of the user data are spread across RU-1 and RU-2. In some implementations, the data portion of the PPDU 800 may be one example of the data payload 702 of FIG. 7. The EHT modulated fields 804, including EHT-STF and EHT-LTF, are mapped to the wireless channel in accordance with the same tone plan (such as the tone plan used by the data portion of the PPDU 800). Thus, EHT-STF and EHT-LTF may each be mapped to two 484-tone RUs (such as RU-1 and RU-2).

As shown in FIG. 8, interference detected in a small portion of the wireless channel (such as due to the $3^{rd}$ 20 MHz subchannel being busy) causes the transmitting device to reduce the bandwidth of the PPDU by one half (such as from 160 MHz to 80 MHz), thus halving the throughput of the user data transmitted in the EHT DUP mode. Aspects of the present disclosure recognize that spectral efficiency can be optimized by transmitting a PPDU over a wireless channel that spans the entire bandwidth range (such as 160 MHz) and puncturing only the busy subchannels (such as the $3^{rd}$ 20 MHz subchannel). However, because the EHT DUP mode defined by an initial release of the IEEE 802.11be amendment cannot be used with channel puncturing, new PPDU designs are needed to support duplicate transmissions over bandwidths with punctured subchannels. In some aspects, channel puncturing may result in the transmission of a punctured RU in the data portion of a PPDU. In some other aspects, RUs or MRUs may be allocated for transmission in a PPDU to avoid the punctured subchannels.

Figure 9:
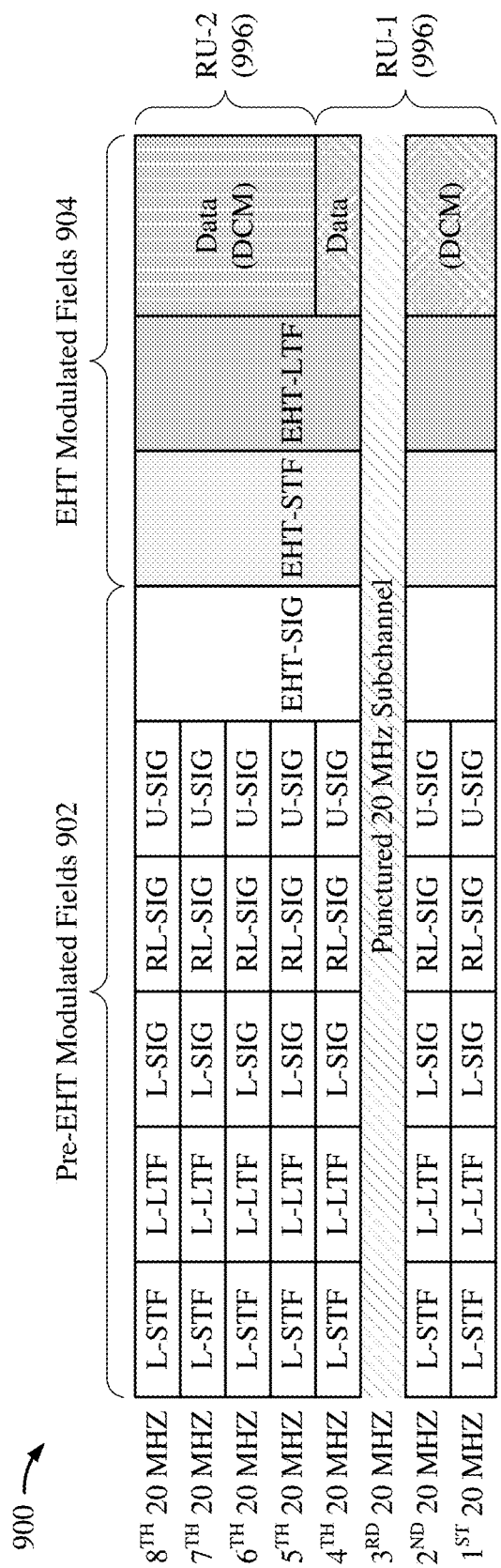
FIG. 9 shows an example frame structure of a PPDU configured for duplicate transmission with channel puncturing according to some implementations.

FIG. 9 shows an example frame structure of a PPDU 900 configured for duplicate transmission with channel puncturing according to some implementations. In some implementations, the PPDU 900 may be one example of the PPDU 600 of FIG. 6. More specifically, the PPDU 900 may conform to the EHT MU PPDU format for transmission to a single user. In the example of FIG. 9, a transmitting device may be capable of transmitting the PPDU 900 over a 160 MHz bandwidth. However, as shown in FIG. 9, the $3^{rd}$ 20 MHz subchannel of the 160 MHz bandwidth is busy. In some implementations, the PPDU 900 may be transmitted over a wireless channel spanning the 160 MHz bandwidth while puncturing (or excluding) the $3^{rd}$ 20 MHz subchannel.

The PPDU 900 includes a number of pre-EHT modulated fields 902 and a number of EHT modulated fields 904. The pre-EHT modulated fields 902 include L-STF, L-LTF, L-SIG, RL-SIG, U-SIG, and EHT-SIG, which represent a first portion of a PHY preamble of the PPDU 900. The EHT modulated fields 904 include EHT-STF and EHT-LTF, which represent a second portion of the PHY preamble, as well as a data portion of the PPDU 900. As described with reference to FIG. 6, U-SIG includes a bandwidth subfield and a punctured channel indication subfield. In the example of FIG. 9, the bandwidth subfield may carry bandwidth information indicating that the PPDU 900 is transmitted over a wireless channel spanning a 160 MHz bandwidth and the punctured channel indication subfield may carry punctured channel information indicating that the $3^{rd}$ 20 MHz subchannel of the 160 MHz bandwidth is punctured. In some implementations, the PPDU type and compression mode subfield of U-SIG may be set to 1 and the MCS subfield of the user field in EHT-SIG may be set to a value representing EHT-MCS14, which indicates that the data portion of the PPDU 900 is transmitted in a DUP mode and the data portion of the PPDU 900 is modulated in accordance with DCM, binary phase-shift keying (BPSK), and rate 1/2 coding. Because the $3^{rd}$ 20 MHz subchannel of the 160 MHz bandwidth is punctured, the pre-EHT modulated fields 902 are not transmitted on the $3^{rd}$ 20 MHz subchannel.

In some aspects, the user data may be mapped to a number (N) of tones spanning the lower half of a supported bandwidth size (such as an 80 MHz, 160 MHz, or 320 MHz bandwidth) and a duplicate copy of the user data may be mapped to N tones spanning the upper half of the bandwidth. In the example of FIG. 9, the N tones spanning the lower half of the 160 MHz bandwidth represent a first 996-tone RU (RU-1) and the N tones spanning the upper half of the 160 MHz bandwidth represent a second 996-tone RU (RU-2). In some implementations the user data may be mapped to RU-1 in accordance with a DCM scheme and the duplicate copy of the user data may be mapped to RU-2 also in accordance with the DCM scheme. The remaining EHT modulated fields 904, including EHT-STF and EHT-LTF, may each be mapped to two 996-tone RUs as well (such as RU-1 and RU-2).

In some implementations, portions of the EHT modulated fields 904 that are mapped to a set of tones coinciding with (or overlapping) one or more punctured subchannels (also referred to as "punctured tones") may be excluded from transmission. For example, the punctured tones may not be populated or otherwise modulated with information or data. In some aspects, the punctured tones may include a respective range of tones spanning each punctured subchannel in addition to two tones immediately below, and three tones immediately above, each of the ranges (to be used as guard tones). With reference for example to FIG. 9, the entire 160 MHz bandwidth spans the range of tones [−1024:1023] and the $3^{rd}$ 20 MHz subchannel of a 160 MHz bandwidth spans the range of tones [−512:−257]. Thus, the punctured tones associated with the $3^{rd}$ 20 MHz subchannel span the range [−514:−254]. As such, only the tones of RU-1 that fall within the range [−1012:−515, −253:−12], and the tones of RU-2 that fall within the range [12:509, 515:1012], are populated for transmission in the PPDU 900.

A receiving device that receives the PPDU 900 may determine the mapping of the user data to RU-1 and RU-2 based on information carried in the PHY preamble of the PPDU 900. For example, the receiving device may determine that the user data is mapped to a first 996-tone RU (RU-1) in accordance with a DCM scheme and that a duplicate copy of the user data is mapped to a second 996-tone RU (RU-2) in accordance with the DCM scheme based on the indication that the PPDU 900 is transmitted over a 160 MHz bandwidth and the indication that the user data is transmitted in a DUP mode. The receiving device may further determine that only the tones of RU-1 falling within the range [−1012:−515, −253:−12] are populated based on the indication, in the punctured channel indication subfield of U-SIG, that the $3^{rd}$ 20 MHz subchannel of the 160 MHz bandwidth is punctured. Thus, when calculating log-likelihood ratios (LLRs) for each bit of the user data received on the 996 tones spanning RU-1, the receiving device may set the LLRs associated with punctured tones (in the range [−514:−254]) to zero.

Aspects of the present disclosure recognize that the throughput of the PPDU 900 is equal to that of a PPDU transmitted in accordance with the EHT DUP mode over a 160 MHz bandwidth (without channel puncturing), which is significantly higher than that of a PPDU transmitted in accordance with the EHT DUP mode over an 80 MHz bandwidth (such as described with reference to FIG. 8). For example, the amount of user data that can be mapped to a 996-tone RU is slightly more than twice the amount of user data that can be mapped to a 484-tone RU (such as shown in FIG. 8). However, the puncturing of RU-1 may slightly reduce the effective range of the PPDU 900. For example, the receiving device may receive 4 copies of the user data mapped to the $2^{nd}$ 20 MHz subchannel (where each copy is received on a respective one of the $2^{nd}$, $4^{th}$, $6^{th}$, and $8^{th}$ 20 MHz subchannels) and only 3 copies of the user data mapped to the $1^{st}$ 20 MHz subchannel (where each copy is received on a respective one of the $1^{st}$, $5^{th}$, and $7^{th}$ 20 MHz subchannels). As a result, the range of the PPDU 900 is reduced by $10*\log_{10}(7/8)=0.58$ dB.

The channel puncturing techniques described with reference to FIG. 9 can be applied to different PPDU bandwidths and punctured channel sizes. For example, an 80 MHz bandwidth may support puncturing of 20 MHz subchannels, a 160 MHz bandwidth may support puncturing of 20 MHz or 40 MHz subchannels, and a 320 MHz bandwidth may support puncturing of 20 MHz, 40 MHz, or 80 MHz subchannels. For example, Table 1 provides a summary of how the puncturing techniques described with reference to FIG. 9 can be applied to various combinations of PPDU bandwidths and puncturing patterns.

TABLE 1

| Channel Availability | Puncturing Pattern | Tone Mapping Scheme |
|---|---|---|
| 80-20 | Any one 20 MHz punctured | 80 MHz PPDU in a DUP mode with no transmission in one 20 MHz |
| 160-20 | Any one 20 MHz punctured | 160 MHz PPDU in a DUP mode with no transmission in one 20 MHz |
| 160-40 | Any one 40 MHz punctured | 160 MHz PPDU in a DUP mode with no transmission in one 40 MHz |
| 320-20 | Any one 20 MHz punctured | 320 MHz PPDU in a DUP mode with no transmission in one 20 MHz |
| 320-40 | Any one 40 MHz punctured | 320 MHz PPDU in a DUP mode with no transmission in one 40 MHz |

TABLE 1-continued

| Channel Availability | Puncturing Pattern | Tone Mapping Scheme |
|---|---|---|
| 320-80 | Any one 80 MHz punctured | 320 MHz PPDU in a DUP mode with no transmission in one 80 MHz |
| 320-80-40 | [x x x 1 1 1 1 1], [x x 1 x 1 1 1 1], [x x 1 1 1 1 x 1], [x x 1 1 1 1 1 x], [x 1 1 1 1 1 x x], [1 x 1 1 1 1 x x], [1 1 1 1 x 1 x x], [1 1 1 1 x x x] | 160 MHz PPDU in a DUP mode |
| | [x x 1 1 x 1 1 1], [x x 1 1 1 x 1 1], [1 1 x 1 1 1 x x], [1 1 1 x 1 1 x x] | 80 MHz PPDU in a DUP mode |

In the puncturing patterns depicted for the 320-80-40 MHz channel availability, each "x" represents a respective punctured 40 MHz subchannel and each "1" represents a respective 40 MHz subchannel that is not punctured. For example, the puncturing pattern [x x 1 1 x 1 1 1] indicates that the $1^{st}$, $2^{nd}$ and $5^{th}$ 40 MHz subchannels of a 320 MHz bandwidth are punctured, whereas the $3^{rd}$, $4^{th}$, $6^{th}$, $7^{th}$, and $8^{th}$ 40 MHz subchannels of the 320 MHz bandwidth are not punctured.

Aspects of the present disclosure recognize that the range of punctured tones associated with a 40 MHz subchannel (including the tones spanning the 40 MHz subchannel in addition to two tones immediately below, and three tones immediately above, the 40 MHz subchannel) is equivalent to the range of punctured tones associated with two adjacent 20 MHz subchannels that form the 40 MHz subchannel (including the tones spanning each of the 20 MHz subchannels in addition to two tones immediately below, and three tones immediately above, the 20 MHz subchannels), and the range of punctured tones associated with an 80 MHz subchannel (including the tones spanning the 80 MHz subchannel in addition to two tones immediately below, and three tones immediately above, the 80 MHz subchannel) is equivalent to the range of punctured tones associated with four 20 MHz subchannels that form the 80 MHz subchannel (including the tones spanning each of the 40 MHz subchannels in addition to two tones immediately below, and three tones immediately above, the 40 MHz subchannels). In some aspects, to simplify or reduce the number of puncturing patterns, a transmitting device may only be permitted to puncture 40 MHz subchannels in a 160 MHz bandwidth. For example, if a 20 MHz subchannel of the 160 MHz bandwidth is busy, the transmitting device must puncture the 40 MHz subchannel that includes the busy 20 MHz subchannel. Similarly, in some aspects, a transmitting device may only be permitted to puncture 40 MHz or 80 MHz subchannels in a 320 MHz bandwidth.

Figure 10:
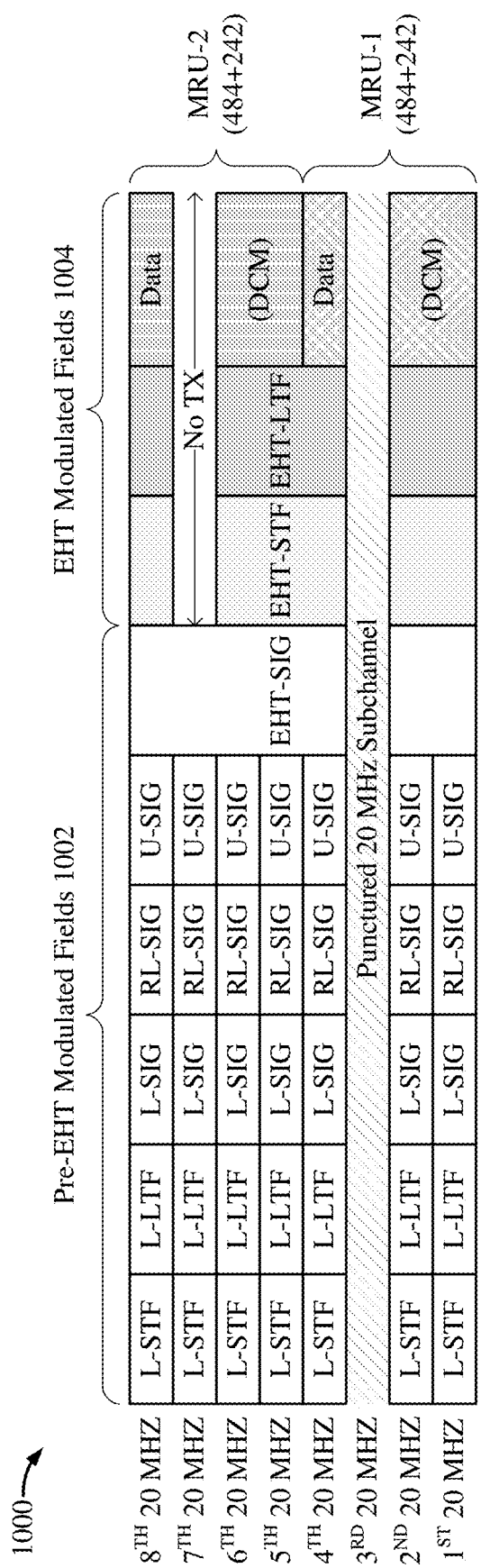
FIG. 10 shows another example frame structure of a PPDU configured for duplicate transmission with channel puncturing according to some implementations.

FIG. 10 shows another example frame structure of a PPDU 1000 configured for duplicate transmission with channel puncturing according to some implementations. More specifically, the PPDU 1000 may conform to the EHT MU PPDU format for transmission to a single user. In the example of FIG. 10, a transmitting device may be capable of transmitting the PPDU 1000 over a 160 MHz bandwidth. However, as shown in FIG. 10, the $3^{rd}$ 20 MHz subchannel of the 160 MHz bandwidth is busy. In some implementations, the PPDU 1000 may be transmitted over a wireless channel spanning the 160 MHz bandwidth while puncturing (or excluding) the $3^{rd}$ 20 MHz subchannel.

The PPDU 1000 includes a number of pre-EHT modulated fields 1002 and a number of EHT modulated fields 1004. The pre-EHT modulated fields 1002 include L-STF, L-LTF, L-SIG, RL-SIG, U-SIG, and EHT-SIG, which represent a first portion of a PHY preamble of the PPDU 1000. The EHT modulated fields 1004 include EHT-STF and EHT-LTF, which represent a second portion of the PHY preamble, as well as a data portion of the PPDU 1000. As described with reference to FIG. 6, U-SIG includes a bandwidth subfield and a punctured channel indication subfield. In the example of FIG. 10, the bandwidth subfield may carry bandwidth information indicating that the PPDU 1000 is transmitted over a wireless channel spanning a 160 MHz bandwidth and the punctured channel indication subfield may carry punctured channel information indicating that the $3^{rd}$ 20 MHz subchannel of the 160 MHz bandwidth is punctured. In some implementations, the PPDU type and compression mode subfield of U-SIG may be set to 1 and the MCS subfield of the user field in EHT-SIG may be set to a value representing EHT-MCS14, which indicates that the PPDU 1000 is transmitted in a DUP mode and the data portion of the PPDU 1000 is modulated in accordance with DCM, BPSK, and rate 1/2 coding. Because the $3^{rd}$ 20 MHz subchannel of the 160 MHz bandwidth is punctured, the pre-EHT modulated fields 1002 are not transmitted on the $3^{rd}$ 20 MHz subchannel.

In some aspects, the user data is first mapped to half of a supported bandwidth size (such as an 80 MHz, 160 MHz, or 320 MHz bandwidth) that includes the greatest number of punctured subchannels. More specifically, the user data may be mapped to an RU or MRU that avoids the punctured subchannel(s). In the example of FIG. 10, the punctured subchannel resides in the lower half of the 160 MHz bandwidth. Thus, the user data may be mapped to a first 484+242-tone MRU (MRU-1) that includes 484 tones spanning the $1^{st}$ and $2^{nd}$ 20 MHz subchannels and 242 tones spanning the $4^{th}$ 20 MHz subchannel. A duplicate copy of the user data may be mapped to the same size RU or MRU in the other half of the bandwidth. For example, the duplicate copy of the user data may be mapped to a second 484+242-tone MRU (MRU-2) that includes 484 tones spanning the $5^{th}$ and $6^{th}$ 20 MHz subchannels and 242 tones spanning the $8^{th}$ 20 MHz subchannel. In some implementations the user data may be mapped to MRU-1 in accordance with a DCM scheme and the duplicate copy of the user data may be mapped to MRU-2 also in accordance with the DCM scheme. The remaining EHT modulated fields 1004, including EHT-STF and EHT-LTF, may each be mapped to two 484+242-tone MRUs as well (such as MRU-1 and MRU-2).

In some implementations, the second RU or MRU may be of the same size as the first RU or MRU but of different shape or relative location within the other half of PPDU bandwidth. In some implementations, the second MRU may be symmetric in shape to the first MRU. For example, the duplicate copy of the user data may be mapped to a second 484+242-tone MRU (MRU-2) that includes 484 tones spanning the $7^{th}$ and $8^{th}$ 20 MHz subchannels and 242 tones spanning the $5^{th}$ 20 MHz subchannel. In some other implementations, the second MRU may be formed by the 20 MHz subchannels that are lowest in frequency. For example, the duplicate copy of the user data may be mapped to a second 484+242-tone MRU (MRU-2) that includes 484 tones spanning the $5^{th}$ and $6^{th}$ 20 MHz subchannels and 242 tones spanning the $7^{th}$ 20 MHz subchannel. Still further, in some implementations, the second MRU may be formed by the 20 MHz subchannels that are highest in frequency. For example, the duplicate copy of the user data may be mapped to a second 484+242-tone MRU (MRU-2) that includes 484 tones spanning the $7^{th}$ and $8^{th}$ 20 MHz subchannels and 242 tones spanning the $6^{th}$ 20 MHz subchannel.

A receiving device that receives the PPDU 1000 may determine the mapping of the user data to MRU-1 and MRU-2 based on information carried in the PHY preamble of the PPDU 1000. For example, the receiving device may determine that the user data is mapped to a number (N) of tones in the lower half of the 160 MHz bandwidth (in accordance with a DCM scheme) and that a duplicate copy of the user data is mapped to N tones in the upper half of the 160 MHz bandwidth (in accordance with the DCM scheme) based on the indication that the PPDU 1000 is transmitted over a 160 MHz bandwidth, the punctured channel indication subfield in U-SIG, and the indication that the user data is transmitted using DCM, BPSK, and rate 1/2 coding. The receiving device may further determine that the N tones in the lower half of the 160 MHz bandwidth represent a 484+242-tone MRU (MRU-1) that avoids the $3^{rd}$ 20 MHz subchannel based on the indication that the $3^{rd}$ 20 MHz subchannel of the 160 MHz bandwidth is punctured. As such, the receiving device also may determine that the N tones in the upper half of the 160 MHz bandwidth represent a 484+242-tone MRU (MRU-2).

Aspects of the present disclosure recognize that the throughput of the PPDU 1000 is substantially higher than that of a PPDU transmitted in accordance with the EHT DUP mode over an 80 MHz bandwidth (such as described with reference to FIG. 8). For example, the amount of user data that can be mapped to a 484+242-tone MRU is equal to 1.5× the amount of user data that can be mapped to a 484-tone RU (such as shown in FIG. 8). Moreover, the effective range of the PPDU 1000 is the same as that of a PPDU transmitted in accordance with the EHT DUP mode. For example, the receiving device may receive a total of 4 copies of the same user data spread across MRU-1 and MRU-2, resulting in a 4× gain in SINR for the data portion of the received PPDU 1000.

The channel puncturing techniques described with reference to FIG. 10 can be applied to different PPDU bandwidths and punctured channel sizes. For example, Table 2 provides a summary of how the puncturing techniques described with reference to FIG. 10 can be applied to various combinations of PPDU bandwidths and puncturing patterns.

TABLE 2

| Channel Availability | Puncturing Pattern | Tone Mapping Scheme |
|---|---|---|
| 160-20 | Any one 20 MHz punctured | 160 MHz PPDU, data duplicated in two 484 + 242-tone MRUs using DCM in each 484 + 242-tone MRU |
| 160-40 | Any one 40 MHz punctured | 80 MHz PPDU in a DUP mode |
| 320-20 | Any one 20 MHz punctured | 320 MHz PPDU, data duplicated in two 996 + 484 + 242-tone MRUs using DCM in each 996 + 484 + 242-tone MRU |
| 320-40 | Any one 40 MHz punctured | 320 MHz PPDU, data duplicated in two 996 + 484-tone MRUs using DCM in each 996 + 484-tone MRU |
| 320-80 | Any one 80 MHz punctured | 160 MHz PPDU in a DUP mode |
| 320-80-40 | [x x x 1 1 1 1 1], [x x 1 x 1 1 1 1], [x x 1 1 1 1 x 1], [x x 1 1 1 1 1 x], | 160 MHz PPDU in a DUP mode |

TABLE 2-continued

| Channel Availability | Puncturing Pattern | Tone Mapping Scheme |
|---|---|---|
| | [x 1 1 1 1 1 x x], [1 x 1 1 1 1 x x], [1 1 1 1 x 1 x x], [1 1 1 1 1 x x x] | |
| | [x x 1 1 x 1 1 1], [x x 1 1 1 x 1 1], [1 1 x 1 1 1 x x], [1 1 1 x 1 1 x x] | 320 MHz PPDU, data duplicated in two 996-tone RUs using DCM |

In some implementations, to reduce the PAPR of the duplicate transmission, the transmitting device may apply a respective phase rotation (such as 1 or −1, in the frequency domain) to each of the two RUs or MRUs. In some other implementations, the transmitting device may apply a respective phase rotation (such as 1 or −1, in the frequency domain) to each copy of the user data. In some other implementations, the transmitting device may apply a respective phase rotation (such as 1 or −1, in the frequency domain) to each tone in both RUs or MRUs. Still further, in some implementations, the transmitting device may apply a respective phase rotation (such as 1 or −1, in the frequency domain) to each subset of tones within each copy of the user data.

Figure 11A:
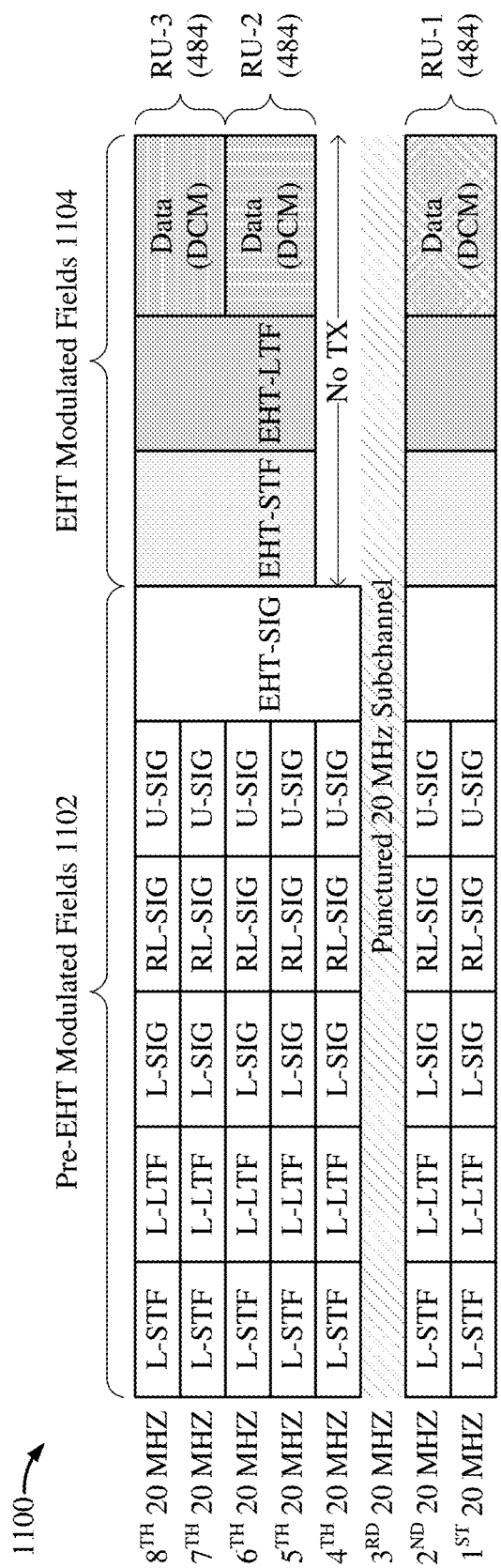
FIG. 11A shows an example frame structure of a PPDU configured for duplicate transmission with channel puncturing according to some implementations.

FIG. 11A shows an example frame structure of a PPDU 1100 configured for duplicate transmission with channel puncturing according to some implementations. More specifically, the PPDU 1100 may conform to the EHT MU PPDU format for transmission to a single user. In the example of FIG. 11A, a transmitting device may be capable of transmitting the PPDU 1100 over a 160 MHz bandwidth. However, as shown in FIG. 11A, the $3^{rd}$ 20 MHz subchannel of the 160 MHz bandwidth is busy. In some implementations, the PPDU 1100 may be transmitted over a wireless channel spanning the 160 MHz bandwidth while puncturing (or excluding) the $3^{rd}$ 20 MHz subchannel.

The PPDU 1100 includes a number of pre-EHT modulated fields 1102 and a number of EHT modulated fields 1104. The pre-EHT modulated fields 1102 include L-STF, L-LTF, L-SIG, RL-SIG, U-SIG, and EHT-SIG, which represent a first portion of a PHY preamble of the PPDU 1100. The EHT modulated fields 1104 include EHT-STF and EHT-LTF, which represent a second portion of the PHY preamble, as well as a data portion of the PPDU 1100. As described with reference to FIG. 6, U-SIG includes a bandwidth subfield and a punctured channel indication subfield. In the example of FIG. 11A, the bandwidth subfield may carry bandwidth information indicating that the PPDU 1100 is transmitted over a wireless channel spanning a 160 MHz bandwidth and the punctured channel indication subfield may carry punctured channel information indicating that the $3^{rd}$ 20 MHz subchannel of the 160 MHz bandwidth is punctured. In some implementations, the PPDU type and compression mode subfield of U-SIG may be set to 1 and the MCS subfield of the user field in EHT-SIG may be set to a value representing EHT-MCS14, which indicates that the PPDU 1100 is transmitted in a DUP mode and the data portion of the PPDU 1100 is modulated in accordance with DCM, BPSK, and rate 1/2 coding. Because the $3^{rd}$ 20 MHz subchannel of the 160 MHz bandwidth is punctured, the pre-EHT modulated fields 1102 are not transmitted on the $3^{rd}$ 20 MHz subchannel.

In some aspects, a number (M) of equal-size RUs may be allocated for transmission in the PPDU 1100, where M>2 and each RU includes 484 tones or 996 tones. More specifically, the M RUs may span the bandwidth of the PPDU 1100 while avoiding the punctured subchannel(s). In some implementations, the user data may be mapped to one of the M RUs in accordance with a DCM scheme and duplicate copies of the user data may be mapped to the remaining M−1 RUs, respectively, also in accordance with the DCM scheme. In the example of FIG. 11A, three 484-tone RUs (RU-1, RU-2, and RU-3) are allocated for transmission in the PPDU 1100. More specifically, RU-1 includes 484 tones spanning the $1^{st}$ and $2^{nd}$ 20 MHz subchannels, RU-2 includes 484 tones spanning the $5^{th}$ and $6^{th}$ 20 MHz subchannels, and RU-3 includes 484 tones spanning the $7^{th}$ and $8^{th}$ 20 MHz subchannels. The user data may be mapped to RU-1 in accordance with a DCM scheme and a respective duplicate copy of the user data may be mapped to each of RU-2 and RU-3 in accordance with the DCM scheme. The remaining EHT modulated fields 1104, including EHT-STF and EHT-LTF, may each be mapped to three 484-tone RUs as well (such as RU-1, RU-2, and RU-3).

A receiving device that receives the PPDU 1100 may determine the mapping of the user data to RU-1, RU-2, and RU-3 based on information carried in the PHY preamble of the PPDU 1100. For example, the receiving device may determine that the user data is mapped to a first 484-tone RU (RU-1) and that two duplicate copies of the user data are mapped to two more 484-tone RUs (RU-2 and RU-3), respectively, based on the indication that the PPDU 1100 is transmitted over a 160 MHz bandwidth, the punctured channel indication subfield in U-SIG, and the indication that the user data is transmitted using DCM, BPSK, and rate 1/2 coding. The receiving device may further determine that RU-1 coincides with the $1^{st}$ and $2^{nd}$ 20 MHz subchannels, RU-2 coincides with the $4^{th}$ and $5^{th}$ 20 MHz subchannels, and RU-3 coincides with the $7^{th}$ and $8^{th}$ 20 MHz subchannels based on the indication that the $3^{rd}$ 20 MHz subchannel is punctured.

Aspects of the present disclosure recognize that the throughput of the PPDU 1100 is equal to that of a PPDU transmitted in accordance with the EHT DUP mode over an 80 MHz bandwidth (such as described with reference to FIG. 8). However, the effective range of the PPDU 1100 is substantially greater than that of a PPDU transmitted in accordance with the EHT DUP mode. For example, the receiving device may receive a total of 6 copies of the same user data spread across RU-1, RU-2, and RU-3, resulting in a 6× (rather than 4×) gain in SINR for the data portion of the received PPDU 1100 (which represents a $10*\log_{10}(6/4)=1.76$ dB increase in effective range).

In some aspects, one or more power boosting techniques may be applied to the PHY preamble of the PPDU 1100 to realize such gains in power for the data portion of the PPDU 1100. In some implementations, the receiving device may boost the power of the PHY preamble by processing the PHY preamble across the entire 160 MHz bandwidth. In some other implementations, the transmitting device may boost the power of the PHY preamble by repeating one or more fields of the PHY preamble (such as U-SIG and EHT-SIG) in the time domain. In such implementations, the PHY preamble of the PPDU 1100 may conform with an ER PHY preamble format defined by an initial release of the IEEE 802.11be amendment of the IEEE 802.11 standard.

Figure 11B:
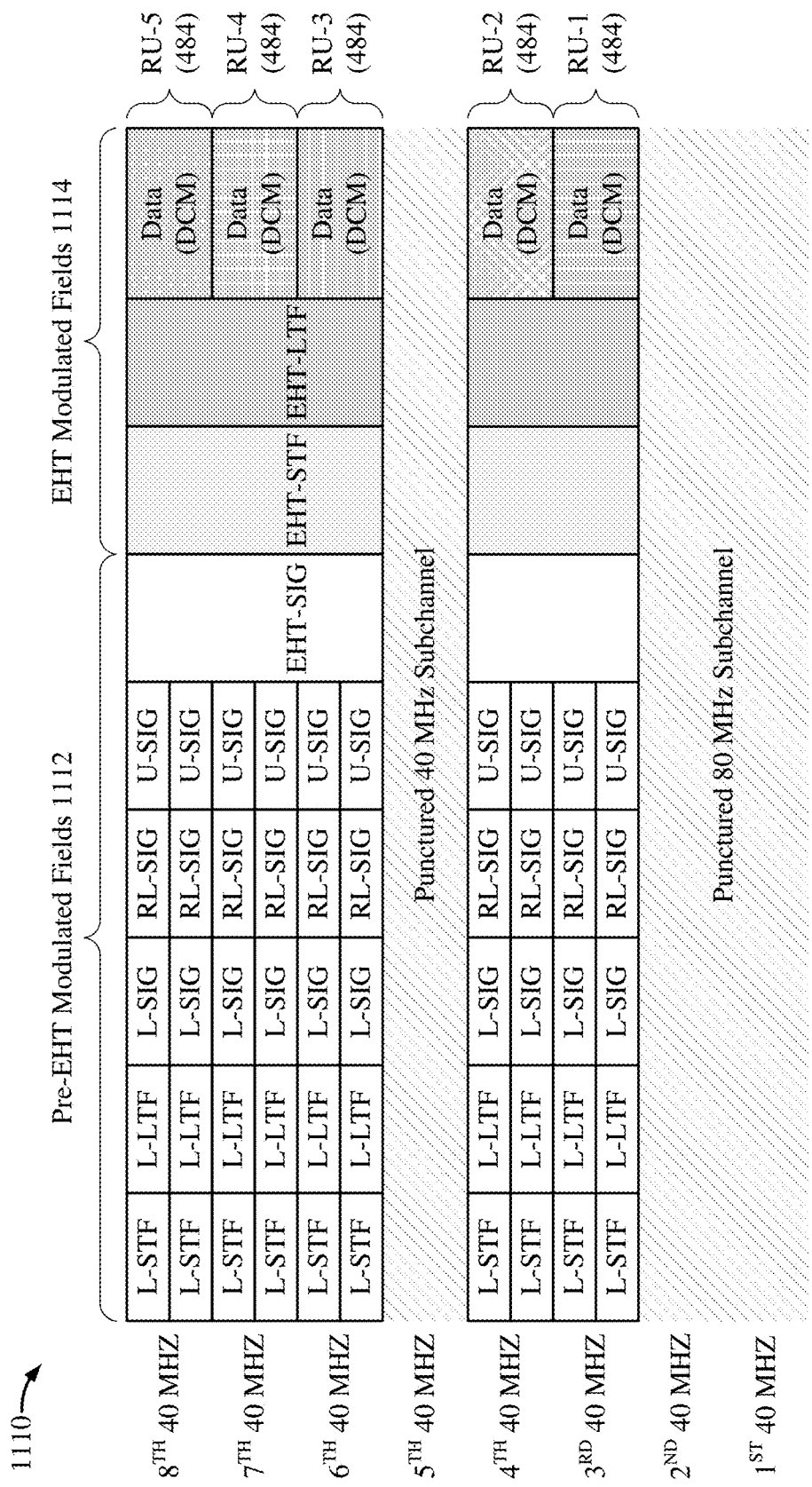
FIG. 11B shows an example frame structure of a PPDU configured for duplicate transmission with channel puncturing according to some implementations.

FIG. 11B shows an example frame structure of a PPDU 1110 configured for duplicate transmission with channel puncturing according to some implementations. More specifically, the PPDU 1110 may conform to the EHT MU PPDU format for transmission to a single user. In the example of FIG. 11B, a transmitting device may be capable of transmitting the PPDU 1110 over a 320 MHz bandwidth. However, as shown in FIG. 11B, the $1^{st}$, $2^{nd}$, and $5^{th}$ 40 MHz subchannels of the 320 MHz bandwidth are busy. In some implementations, the PPDU 1110 may be transmitted over a wireless channel spanning the 320 MHz bandwidth while puncturing (or excluding) the $1^{st}$, $2^{nd}$ and $5^{th}$ 40 MHz subchannels.

The PPDU 1110 includes a number of pre-EHT modulated fields 1112 and a number of EHT modulated fields 1114. The pre-EHT modulated fields 1112 include L-STF, L-LTF, L-SIG, RL-SIG, U-SIG, and EHT-SIG, which represent a first portion of a PHY preamble of the PPDU 1110. The EHT modulated fields 1114 include EHT-STF and EHT-LTF, which represent a second portion of the PHY preamble, as well as a data portion of the PPDU 1110. As described with reference to FIG. 6, U-SIG includes a bandwidth subfield and a punctured channel indication subfield. In the example of FIG. 11B, the bandwidth subfield may carry bandwidth information indicating that the PPDU 1110 is transmitted over a wireless channel spanning a 320 MHz bandwidth and the punctured channel indication subfield may carry punctured channel information indicating that the $1^{st}$, $2^{nd}$, and $5^{th}$ 40 MHz subchannels of the 320 MHz bandwidth are punctured. In some implementations, the PPDU type and compression mode subfield of U-SIG may be set to 1 and the MCS subfield of the user field in EHT-SIG may be set to a value representing EHT-MCS14, which indicates that the PPDU 1110 is transmitted in a DUP mode and the data portion of the PPDU 1100 is modulated in accordance with DCM, BPSK, and rate 1/2 coding. Because the $1^{st}$, $2^{nd}$, and $5^{th}$ 40 MHz subchannels of the 320 MHz bandwidth are punctured, the pre-EHT modulated fields 1112 are not transmitted on the $1^{st}$, $2^{nd}$, and $5^{th}$ 40 MHz subchannels.

In some aspects, a number (M) of equal-size RUs may be allocated for transmission in the PPDU 1110, where M>2 and each RU includes 484 tones or 996 tones. More specifically, the M RUs may span the bandwidth of the PPDU 1110 while avoiding the punctured subchannel(s). In some implementations, the user data may be mapped to one of the M RUs in accordance with a DCM scheme and duplicate copies of the user data may be mapped to the remaining M−1 RUs, respectively, also in accordance with the DCM scheme. In the example of FIG. 11B, five 484-tone RUs (RU-1, RU-2, RU-3, RU-4, and RU-5) are allocated for transmission in the PPDU 1110. More specifically, RU-1 includes 484 tones spanning the $3^{rd}$ 40 MHz subchannel, RU-2 includes 484 tones spanning the $4^{th}$ 40 MHz subchannel, RU-3 includes 484 tones spanning the $6^{th}$ 40 MHz subchannel, RU-4 includes 484 tones spanning the $7^{th}$ 40 MHz subchannel, and RU-5 includes 484 tones spanning the $8^{th}$ 40 MHz subchannel. The user data may be mapped to RU-1 in accordance with a DCM scheme and a respective duplicate copy of the user data may be mapped to each of RU-2, RU-3, RU-4, and RU-5 in accordance with the DCM scheme. The remaining EHT modulated fields 1114, including EHT-STF and EHT-LTF, may each be mapped to five 484-tone RUs as well (such as RU-1, RU-2, RU-3, RU-4, and RU-5).

A receiving device that receives the PPDU 1110 may determine the mapping of the user data to RU-1, RU-2, RU-3, RU-4, and RU-5 based on information carried in the PHY preamble of the PPDU 1110. For example, the receiving device may determine that the user data is mapped to a first 484-tone RU (RU-1) and that four duplicate copies of the user data are mapped to four more 484-tone RUs (RU-2, RU-3, RU-4, and RU-5), respectively, based on the indication that the PPDU 1110 is transmitted over a 320 MHz bandwidth, the punctured channel indication in U-SIG, and the indication that the user data is transmitted using DCM, BPSK, and rate 1/2 coding. The receiving device may further determine that RU-1 coincides with the $3^{rd}$ 40 MHz subchannel, RU-2 coincides with the $4^{th}$ 40 MHz subchannel, RU-3 coincides with the $6^{th}$ 40 MHz subchannel, RU-4 coincides with the $7^{th}$ 40 MHz subchannel, and RU-5 coincides with the $8^{th}$ 40 MHz subchannel based on the indication that the $1^{st}$, $2^{nd}$, and $5^{th}$ 40 MHz subchannels are punctured.

As described above, the EHT DUP mode only supports duplicate transmissions over 80 MHz, 160 MHz, and 320 MHz bandwidths without puncturing. In the example of FIG. 11B, the largest non-punctured bandwidth that would be supported by the EHT DUP mode is equal to 80 MHz. Aspects of the present disclosure recognize that the throughput of the PPDU 1110 is equal to that of a PPDU transmitted in accordance with the EHT DUP mode over an 80 MHz bandwidth (such as described with reference to FIG. 8). However, the effective range of the PPDU 1110 is significantly greater than that of a PPDU transmitted in accordance with the EHT DUP mode. For example, the receiving device may receive a total of 10 copies of the same user data spread across RU-1, RU-2, RU-3, RU-4, and RU-5, resulting in a 10x (rather than 4x) gain in SINR for the data portion of the received PPDU 1110 (which represents a $10*\log_{10}(10/4)$ =3.98 dB increase in effective range).

In some aspects, one or more power boosting techniques may be applied to the PHY preamble of the PPDU 1110 to realize such gains in power for the data portion of the PPDU 1110. In some implementations, the receiving device may boost the power of the PHY preamble by processing the PHY preamble across the entire 320 MHz bandwidth. In some other implementations, the transmitting device may boost the power of the PHY preamble by repeating one or more fields of the PHY preamble (such as U-SIG and EHT-SIG) in the time domain. In such implementations, the PHY preamble of the PPDU 1100 may conform with an ER PHY preamble format defined by an initial release of the IEEE 802.11be amendment of the IEEE 802.11 standard.

The channel puncturing techniques described with reference to FIGS. 11A and 11B can be applied to different PPDU bandwidths and punctured channel sizes. For example, Table 3 provides a summary of how the puncturing techniques described with reference to FIGS. 11A and 11B can be applied to various combinations of PPDU bandwidths and puncturing patterns.

TABLE 3

| Channel Availability | Puncturing Pattern | Tone Mapping Scheme |
|---|---|---|
| 160-20 | Any one 20 MHz punctured | 160 MHz PPDU, data duplicated in three 484-tone RUs using DCM in each 484-tone RU |
| 160-40 | Any one 40 MHz punctured | |
| 320-20 | Any one 20 MHz punctured | 320 MHz PPDU, data duplicated in three 996-tone RUs using DCM in each 996-tone RU |
| 320-40 | Any one 40 MHz punctured | |
| 320-80 | Any one 80 MHz punctured | |
| 320-80-40 | [x x x 1 1 1 1 1], [x x 1 x 1 1 1 1], [x x 1 1 1 1 x 1], [x x 1 1 1 1 1 x], | 160 MHz PPDU in a DUP mode |

TABLE 3-continued

| Channel Availability | Puncturing Pattern | Tone Mapping Scheme |
|---|---|---|
| | [x 1 1 1 1 1 x x], [1 x 1 1 1 1 x x], [1 1 1 1 x 1 x x], [1 1 1 1 1 x x x] | |
| | [x x 1 1 x 1 1 1], [x x 1 1 1 x 1 1], [1 1 x 1 1 1 x x], [1 1 1 x 1 1 x x] | 320 MHz PPDU, data duplicated in five 484-tone RUs using DCM in each 484-tone RU |

As shown in Table 3, a single tone plan applies to the data portion of a PPDU transmitted over a 160-20 MHz bandwidth (20 MHz puncturing) and a 160-40 MHz bandwidth (40 MHz puncturing). However, the mapping of the pre-EHT modulated fields of a PHY preamble follows the puncturing pattern indicated by the punctured channel indication subfield of the PHY preamble. As a result, the pre-EHT modulated portion of the PHY preamble may span a different frequency bandwidth than the data portion of the PPDU. For example, as shown in FIG. 11A, the pre-EHT modulated fields 1102 are transmitted on the $4^{th}$ 20 MHz subchannel whereas the EHT modulated fields 1104 are not. In some aspects, to unify the puncturing patterns associated with the 160 MHz bandwidth, a transmitting device may only be permitted to puncture a 40 MHz subchannel of the 160 MHz bandwidth. For example, if a 20 MHz subchannel of the 160 MHz bandwidth is busy, the transmitting device must puncture the 40 MHz subchannel that includes the busy 20 MHz subchannel.

As further shown in Table 3, a single tone plan applies to the data portion of a PPDU transmitted over a 320-20 MHz bandwidth (20 MHz puncturing), a 320-40 MHz bandwidth (40 MHz puncturing), and a 320-80 MHz bandwidth (80 MHz puncturing). In some aspects, to unify the puncturing patterns associated with a single punctured subchannel of the 320 MHz bandwidth, a transmitting device may only be permitted to puncture an 80 MHz subchannel of the 320 MHz bandwidth. For example, if a 20 MHz subchannel of the 320 MHz bandwidth is busy, the transmitting device must puncture the 80 MHz subchannel that includes the busy 20 MHz subchannel. Similarly, if a 40 MHz subchannel of the 320 MHz bandwidth is busy, the transmitting device must puncture the 80 MHz subchannel that includes the busy 40 MHz subchannel.

In some implementations, to reduce the PAPR of the duplicate transmission, the transmitting device may apply a respective phase rotation (such as 1 or −1, in the frequency domain) to each RU. In some other implementations, the transmitting device may apply a respective phase rotation (such as 1 or −1, in the frequency domain) to each copy of the user data. In some other implementations, the transmitting device may apply a respective phase rotation (such as 1 or −1, in the frequency domain) to each tone. Still further, in some implementations, the transmitting device may apply a respective phase rotation (such as 1 or −1, in the frequency domain) to each subset of tones within each copy of the user data.

Figure 12A:
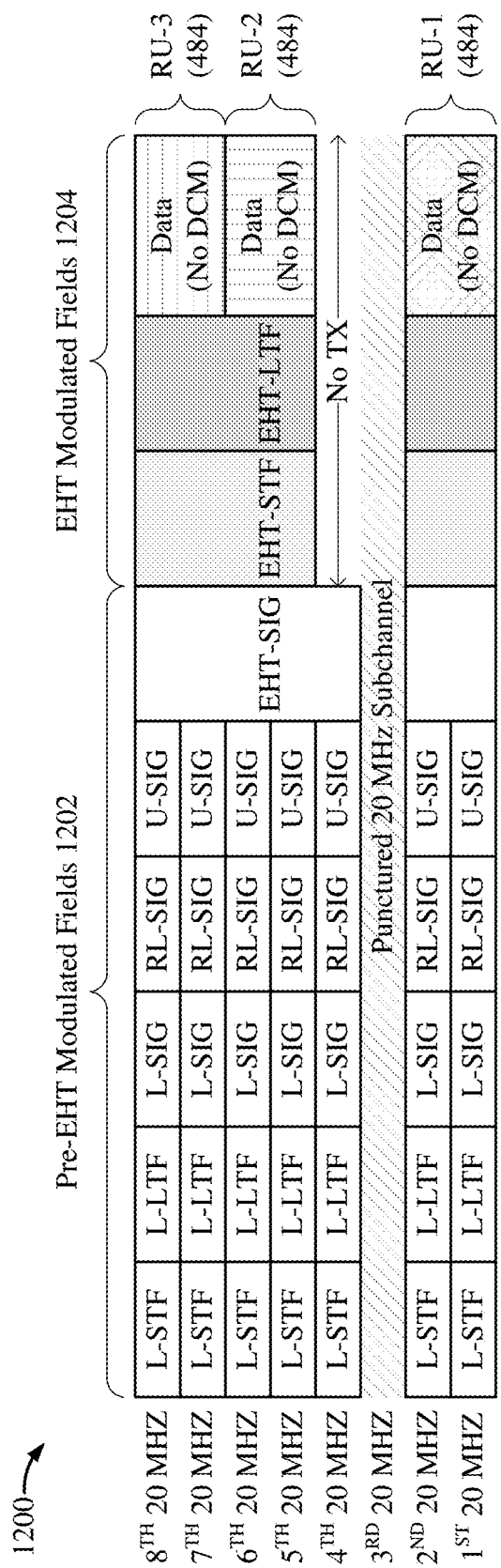
FIG. 12A shows an example frame structure of a PPDU configured for duplicate transmission with channel puncturing according to some implementations.

FIG. 12A shows an example frame structure of a PPDU 1200 configured for duplicate transmission with channel puncturing according to some implementations. More specifically, the PPDU 1200 may conform to the EHT MU PPDU format for transmission to a single user. In the example of FIG. 12A, a transmitting device may be capable of transmitting the PPDU 1200 over a 160 MHz bandwidth.

However, as shown in FIG. 12A, the $3^{rd}$ 20 MHz subchannel of the 160 MHz bandwidth is busy. In some implementations, the PPDU 1200 may be transmitted over a wireless channel spanning the 160 MHz bandwidth while puncturing (or excluding) the $3^{rd}$ 20 MHz subchannel.

The PPDU 1200 includes a number of pre-EHT modulated fields 1202 and a number of EHT modulated fields 1204. The pre-EHT modulated fields 1202 include L-STF, L-LTF, L-SIG, RL-SIG, U-SIG, and EHT-SIG, which represent a first portion of a PHY preamble of the PPDU 1200. The EHT modulated fields 1204 include EHT-STF and EHT-LTF, which represent a second portion of the PHY preamble, as well as a data portion of the PPDU 1200. As described with reference to FIG. 6, U-SIG includes a bandwidth subfield and a punctured channel indication subfield. In the example of FIG. 12A, the bandwidth subfield may carry bandwidth information indicating that the PPDU 1200 is transmitted over a wireless channel spanning a 160 MHz bandwidth and the punctured channel indication subfield may carry punctured channel information indicating that the $3^{rd}$ 20 MHz subchannel of the 160 MHz bandwidth is punctured. In some implementations, the PPDU type and compression mode subfield of U-SIG may be set to 1 and the MCS subfield of the user field in EHT-SIG may be set to a value representing EHT-MCS14, which indicates that the PPDU 1200 is transmitted in a DUP mode and the data portion of the PPDU 1200 is modulated in accordance with BPSK and rate 1/2 coding. Because the $3^{rd}$ 20 MHz subchannel of the 160 MHz bandwidth is punctured, the pre-EHT modulated fields 1202 are not transmitted on the $3^{rd}$ 20 MHz subchannel.

In some aspects, a number (M) of equal-size RUs may be allocated for transmission in the PPDU 1200, where M>2 and each RU includes 484 tones or 996 tones. More specifically, the M RUs may span the bandwidth of the PPDU 1200 while avoiding the punctured subchannel(s). In some implementations, the user data may be mapped to one of the M RUs and duplicate copies of the user data may be mapped to the remaining M−1 RUs, respectively. However, unlike the example of FIG. 11A, DCM is not used in the mapping of user data to any of the RUs in the PPDU 1200. In the example of FIG. 12A, three 484-tone RUs (RU-1, RU-2, and RU-3) are allocated for transmission in the PPDU 1200. More specifically, RU-1 includes 484 tones spanning the $1^{st}$ and $2^{nd}$ 20 MHz subchannels, RU-2 includes 484 tones spanning the $5^{th}$ and $6^{th}$ 20 MHz subchannels, and RU-3 includes 484 tones spanning the $7^{th}$ and $8^{th}$ 20 MHz subchannels. The user data may be mapped to RU-1 and a respective duplicate copy of the user data may be mapped to each of RU-2 and RU-3. The remaining EHT modulated fields 1204, including EHT-STF and EHT-LTF, may each be mapped to three 484-tone RUs as well (such as RU-1, RU-2, and RU-3).

A receiving device that receives the PPDU 1200 may determine the mapping of the user data to RU-1, RU-2, and RU-3 based on information carried in the PHY preamble of the PPDU 1200. For example, the receiving device may determine that the user data is mapped to a first 484-tone RU (RU-1) and that two duplicate copies of the user data are mapped to two more 484-tone RUs (RU-2 and RU-3), respectively, based on the indication that the PPDU 1200 is transmitted over a 160 MHz bandwidth, the punctured channel indication subfield in U-SIG, and the indication that the user data is transmitted using BPSK and rate 1/2 coding. The receiving device may further determine that RU-1 coincides with the $1^{st}$ and $2^{nd}$ 20 MHz subchannels, RU-2 coincides with the $4^{th}$ and $5^{th}$ 20 MHz subchannels, and RU-3 coincides with the $7^{th}$ and $8^{th}$ 20 MHz subchannels based on the indication that the $3^{rd}$ 20 MHz subchannel is punctured.

Aspects of the present disclosure recognize that the throughput of the PPDU 1200 is significantly higher than that of a PPDU transmitted in accordance with the EHT DUP mode over an 80 MHz bandwidth (such as described with reference to FIG. 8). For example, the amount of user data that can be mapped to a 484-tone RU without DCM is equal to twice the amount of user data that can be mapped to a 484-tone RU using DCM (such as shown in FIG. 8). However, the effective range of the PPDU 1200 is slightly less than that of a PPDU transmitted in accordance with the EHT DUP mode. For example, the receiving device may receive a total of 3 copies of the same user data spread across RU-1, RU-2, and RU-3, resulting in a 3x (rather than 4x) gain in SINR for the data portion of the received PPDU 1200 (which represents a $10^*\log_{10}(4/3)=1.25$ dB reduction in effective range).

Figure 12B:
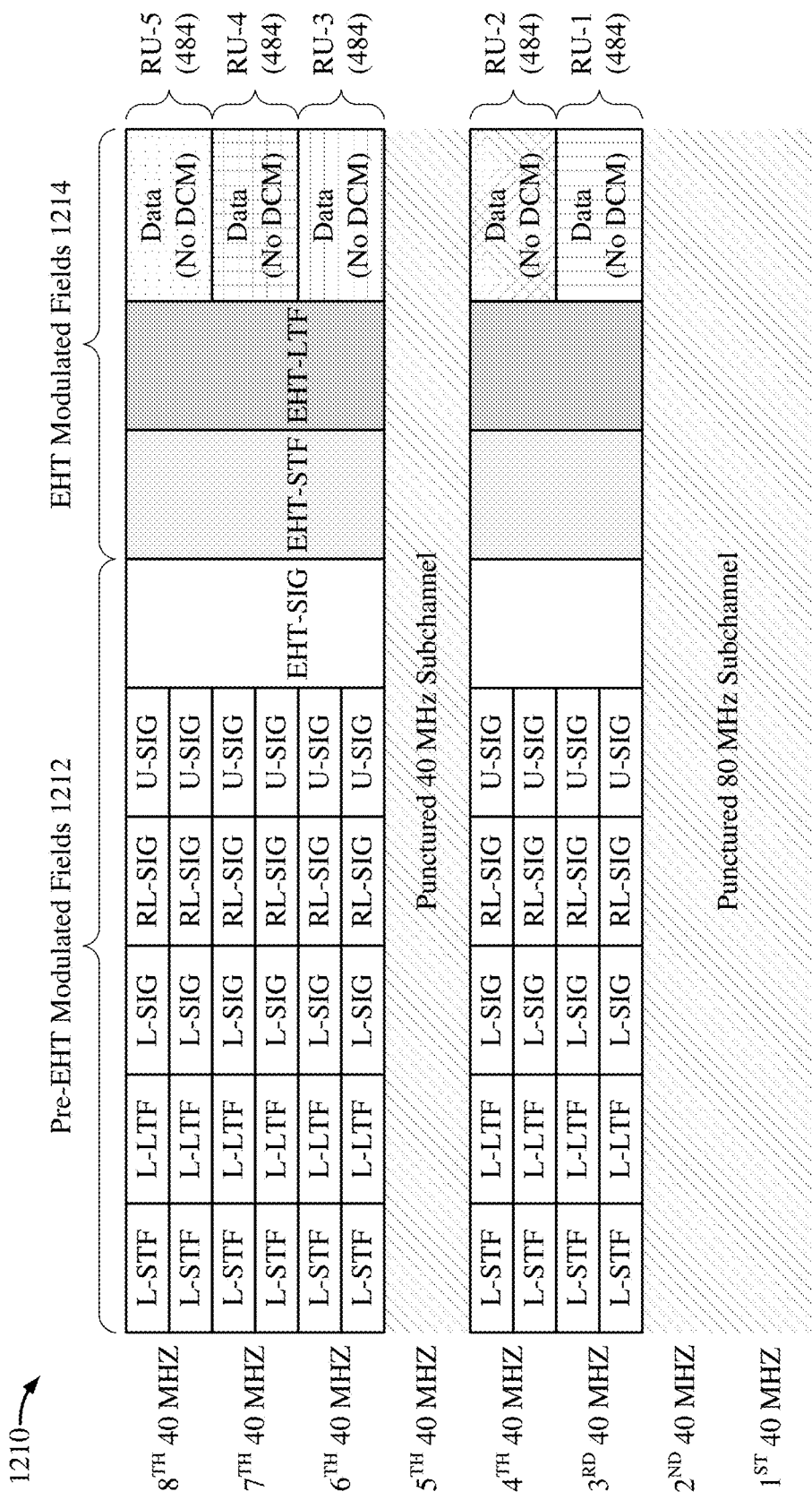
FIG. 12B shows an example frame structure of a PPDU configured for duplicate transmission with channel puncturing according to some implementations.

FIG. 12B shows an example frame structure of a PPDU 1210 configured for duplicate transmission with channel puncturing according to some implementations. More specifically, the PPDU 1210 may conform to the EHT MU PPDU format for transmission to a single user. In the example of FIG. 12B, a transmitting device may be capable of transmitting the PPDU 1210 over a 320 MHz bandwidth. However, as shown in FIG. 12B, the $1^{st}$, $2^{nd}$, and $5^{th}$ 40 MHz subchannels of the 320 MHz bandwidth are busy. In some implementations, the PPDU 1210 may be transmitted over a wireless channel spanning the 320 MHz bandwidth while puncturing (or excluding) the $1^{st}$, $2^{nd}$, and $5^{th}$ 40 MHz subchannels.

The PPDU 1210 includes a number of pre-EHT modulated fields 1212 and a number of EHT modulated fields 1214. The pre-EHT modulated fields 1212 include L-STF, L-LTF, L-SIG, RL-SIG, U-SIG, and EHT-SIG, which represent a first portion of a PHY preamble of the PPDU 1210. The EHT modulated fields 1214 include EHT-STF and EHT-LTF, which represent a second portion of the PHY preamble, as well as a data portion of the PPDU 1210. As described with reference to FIG. 6, U-SIG includes a bandwidth subfield and a punctured channel indication subfield. In the example of FIG. 12B, the bandwidth subfield may carry bandwidth information indicating that the PPDU 1210 is transmitted over a wireless channel spanning a 320 MHz bandwidth and the punctured channel indication subfield may carry punctured channel information indicating that the $1^{st}$, $2^{nd}$, and $5^{th}$ 40 MHz subchannels of the 320 MHz bandwidth are punctured. In some implementations, the PPDU type and compression mode subfield of U-SIG may be set to 1 and the MCS subfield of the user field in EHT-SIG may be set to a value representing EHT-MCS14, which indicates that the PPDU 1200 is transmitted in a DUP mode, and the data portion of the PPDU 1200 is modulated in accordance with BPSK and rate 1/2 coding. Because the $1^{st}$, $2^{nd}$, and $5^{th}$ 40 MHz subchannels of the 320 MHz bandwidth are punctured, the pre-EHT modulated fields 1212 are not transmitted on the $1^{st}$, $2^{nd}$, and $5^{th}$ 40 MHz subchannels.

In some aspects, a number (M) of equal-size RUs may be allocated for transmission in the PPDU 1210, where M>2 and each RU includes 484 tones or 996 tones. More specifically, the M RUs may span the bandwidth of the PPDU 1210 while avoiding the punctured subchannel(s). In some implementations, the user data may be mapped to one of the M RUs and duplicate copies of the user data may be mapped to the remaining M−1 RUs, respectively. However, unlike the example of FIG. 11B, DCM is not used in the mapping of user data to any of the RUs in the PPDU 1210. In the example of FIG. 12B, five 484-tone RUs (RU-1, RU-2, RU-3, RU-4, and RU-5) are allocated for transmission in the PPDU 1210. More specifically, RU-1 includes 484 tones spanning the $3^{rd}$ 40 MHz subchannel, RU-2 includes 484 tones spanning the $4^{th}$ 40 MHz subchannel, RU-3 includes 484 tones spanning the $6^{th}$ 40 MHz subchannel, RU-4 includes 484 tones spanning the $7^{th}$ 40 MHz subchannel, and RU-5 includes 484 tones spanning the $8^{th}$ 40 MHz subchannel. The user data may be mapped to RU-1 and a respective duplicate copy of the user data may be mapped to each of RU-2, RU-3, RU-4, and RU-5. The remaining EHT modulated fields 1214, including EHT-STF and EHT-LTF, may each be mapped to five 484-tone RUs as well (such as RU-1, RU-2, RU-3, RU-4, and RU-5).

A receiving device that receives the PPDU 1210 may determine the mapping of the user data to RU-1, RU-2, RU-3, RU-4, and RU-5 based on information carried in the PHY preamble of the PPDU 1210. For example, the receiving device may determine that the user data is mapped to a first 484-tone RU (RU-1) and that four duplicate copies of the user data are mapped to four more 484-tone RUs (RU-2, RU-3, RU-4, and RU-5), respectively, based on the indication that the PPDU 1210 is transmitted over a 320 MHz bandwidth, the punctured channel indication subfield in U-SIG, and the indication that the user data is transmitted using BPSK and rate 1/2 coding. The receiving device may further determine that RU-1 coincides with the $3^{rd}$ 40 MHz subchannel, RU-2 coincides with the $4^{th}$ 40 MHz subchannel, RU-3 coincides with the $6^{th}$ 40 MHz subchannel, RU-4 coincides with the $7^{th}$ 40 MHz subchannel, and RU-5 coincides with the $8^{th}$ 40 MHz subchannel based on the indication that the $1^{st}$, $2^{nd}$, and $5^{th}$ 40 MHz subchannels are punctured.

As described above, the EHT DUP mode only supports duplicate transmissions over 80 MHz, 160 MHz, and 320 MHz bandwidths without puncturing. In the example of FIG. 12B, the largest non-punctured bandwidth that would be supported by the EHT DUP mode is equal to 80 MHz. Aspects of the present disclosure recognize that the throughput of the PPDU 1210 is significantly higher than that of a PPDU transmitted in accordance with the EHT DUP mode over an 80 MHz bandwidth. For example, the amount of user data that can be mapped to a 484-tone RU without DCM is equal to twice the amount of user data that can be mapped to a 484-tone RU using DCM (such as shown in FIG. 8). Additionally, the effective range of the PPDU 1210 is slightly greater than that of a PPDU transmitted in accordance with the EHT DUP mode. For example, the receiving device may receive a total of 5 copies of the same user data spread across RU-1, RU-2, RU-3, RU-4, and RU-5, resulting in a 5x (rather than 4x) gain in SINR for the data portion of the received PPDU 1210 (which represents a $10*\log_{10}(5/4)=0.97$ dB increase in effective range).

The channel puncturing techniques described with reference to FIGS. 12A and 12B can be applied to different PPDU bandwidths and punctured channel sizes. For example, Table 4 provides a summary of how the puncturing techniques described with reference to FIGS. 12A and 12B can be applied to various combinations of PPDU bandwidths and puncturing patterns.

TABLE 4

| Channel Availability | Puncturing Pattern | Tone Mapping Scheme |
|---|---|---|
| 160-20 | Any one 20 MHz punctured | 160 MHz PPDU, data duplicated in three 484-tone |
| 160-40 | Any one 40 MHz punctured | RUs without DCM in each 484-tone RU |
| 320-20 | Any one 20 MHz punctured | 320 MHz PPDU, data duplicated in three 996-tone |
| 320-40 | Any one 40 MHz punctured | RUs without DCM in each 996-tone RU |
| 320-80 | Any one 80 MHz punctured | |
| 320-80-40 | [x x x 1 1 1 1 1], [x x 1 x 1 1 1 1], [x x 1 1 1 1 x 1], [x x 1 1 1 1 1 x], [x 1 1 1 1 1 x x], [1 x 1 1 1 1 x x], [1 1 1 1 x 1 x x], [1 1 1 1 1 x x x] | 160 MHz PPDU in a DUP mode |
| | [x x 1 1 x 1 1 1], [x x 1 1 1 x 1 1], [1 1 x 1 1 1 x x], [1 1 1 x 1 1 x x] | 320 MHz PPDU, data duplicated in five 484-tone RUs without DCM in each 484-tone RU |

As shown in Table 4, a single tone plan applies to the data portion of a PPDU transmitted over a 160-20 MHz bandwidth (20 MHz puncturing) and a 160-40 MHz bandwidth (40 MHz puncturing). However, as described with reference to FIGS. 11A and 11B, the pre-EHT modulated portion of the PHY preamble may span a different frequency bandwidth than the data portion of the PPDU. In some aspects, to unify the puncturing patterns associated with the 160 MHz bandwidth, a transmitting device may only be permitted to puncture a 40 MHz subchannel of the 160 MHz bandwidth. For example, if a 20 MHz subchannel of the 160 MHz bandwidth is busy, the transmitting device must puncture the 40 MHz subchannel that includes the busy 20 MHz subchannel.

As further shown in Table 4, a single tone plan applies to the data portion of a PPDU transmitted over a 320-20 MHz bandwidth (20 MHz puncturing), a 320-40 MHz bandwidth (40 MHz puncturing), and a 320-80 MHz bandwidth (80 MHz puncturing). In some aspects, to unify the puncturing patterns associated with a single punctured subchannel of the 320 MHz bandwidth, a transmitting device may only be permitted to puncture an 80 MHz subchannel of the 320 MHz bandwidth. For example, if a 20 MHz subchannel of the 320 MHz bandwidth is busy, the transmitting device must puncture the 80 MHz subchannel that includes the busy 20 MHz subchannel. Similarly, if a 40 MHz subchannel of the 320 MHz bandwidth is busy, the transmitting device must puncture the 80 MHz subchannel that includes the busy 40 MHz subchannel.

In some implementations, to reduce the PAPR of the duplicate transmission, the transmitting device may apply a respective phase rotation (such as 1 or −1, in the frequency domain) to each RU (or each copy of the user data). In some other implementations, the transmitting device may apply a respective phase rotation (such as 1 or −1, in the frequency domain) to each tone. Still further, in some implementations, the transmitting device may apply a respective phase rotation (such as 1 or −1, in the frequency domain) to each subset of tones within each copy of the user data.

Figure 13:
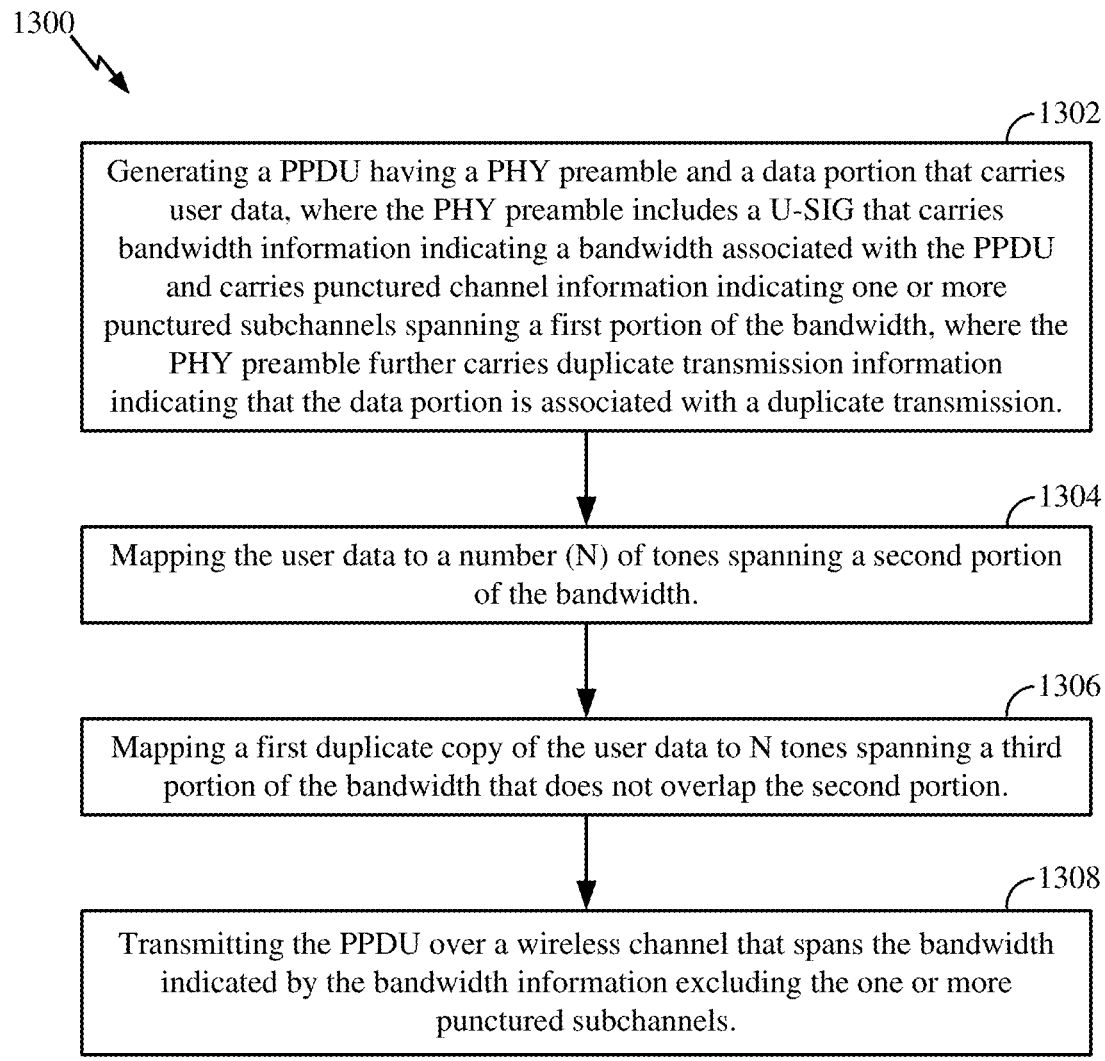
FIG. 13 shows a flowchart illustrating an example process for wireless communication that supports duplicate transmissions with channel puncturing according to some implementations.

FIG. 13 shows a flowchart illustrating an example process 1300 for wireless communication that supports duplicate transmissions with channel puncturing according to some implementations. In some implementations, the process 1300 may be performed by a wireless communication device operating as or within an AP, such as one of the APs 102 or 502 described above with reference to FIGS. 1 and 5A, respectively. In some other implementations, the process 1300 may be performed by a wireless communication device operating as or within a network node, such as one of the STAs 104 or 504 described above with reference to FIGS. 1 and 5B, respectively.

In some implementations, the process 1300 begins in block 1302 with generating a PPDU having a PHY preamble and a data portion that carries user data, where the PHY preamble includes a U-SIG that carries bandwidth information indicating a bandwidth associated with the PPDU and carries punctured channel information indicating one or more punctured subchannels spanning a first portion of the bandwidth, where the PHY preamble further carries duplicate transmission information indicating that the data portion is associated with a duplicate transmission. In block 1304, the process 1300 proceeds with mapping the user data to a number (N) of tones spanning a second portion of the bandwidth. In block 1306, the process 1300 proceeds with mapping a first duplicate copy of the user data to N tones spanning a third portion of the bandwidth that does not overlap the second portion. In block 1308, the process 1300 proceeds with transmitting the PPDU over a wireless channel that spans the bandwidth indicated by the bandwidth information excluding the one or more punctured subchannels.

In some aspects, the first portion of the bandwidth may overlap a subset of the N tones spanning the second portion of the bandwidth. In some implementations, the subset may include a respective range of tones spanned by each of the one or more punctured subchannels in addition to two tones immediately below, or three tones immediately above, each of the ranges. In some implementations, the N tones spanning the second portion of the bandwidth may represent a first RU, in which the subset of tones overlapping the first portion of the bandwidth are not modulated for transmission over the wireless channel, and the N tones spanning the third portion of the bandwidth may represent a second RU, where the user data is mapped to the first RU in accordance with a DCM scheme and the first duplicate copy of the user data is mapped to the second RU in accordance with the DCM scheme.

In some other aspects, the first portion of the bandwidth may not overlap any of the second or third portions of the bandwidth. In some implementations, the N tones spanning the second portion of the bandwidth may represent a first RU or MRU and the N tones spanning the third portion of the bandwidth may represent a second RU or MRU, where the user data is mapped to the first RU or MRU in accordance with a DCM scheme and the first duplicate copy of the user data is mapped to the second RU or MRU in accordance with the DCM scheme.

In some other implementations, the N tones spanning the second portion of the bandwidth may represent a first RU and the N tones spanning the third portion of the bandwidth may represent a second RU. In such implementations, a second duplicate copy of the user data may be mapped to N tones spanning a third RU that does not overlap the first portion of the bandwidth or any of the first or second RUs. In some implementations, the user data may be mapped to the first RU in accordance with a DCM scheme and the first and second duplicate copies of the user data may be mapped to the second and third RUs, respectively, in accordance with the DCM scheme.

In some implementations, a third duplicate copy of the user data may be mapped to N tones spanning a fourth RU that does not overlap the first portion of the bandwidth or any of the first, second, or third RUs; and a fourth duplicate copy of the user data may be mapped to N tones spanning a fifth RU that does not overlap the first portion of the bandwidth or any of the first, second, third, or fourth RUs. In some implementations, the user data may be mapped to the first RU in accordance with a DCM scheme and the first, second, third, and fourth duplicate copies of the user data may be mapped to the second, third, fourth, and fifth RUs, respectively, in accordance with the DCM scheme.

Figure 14:
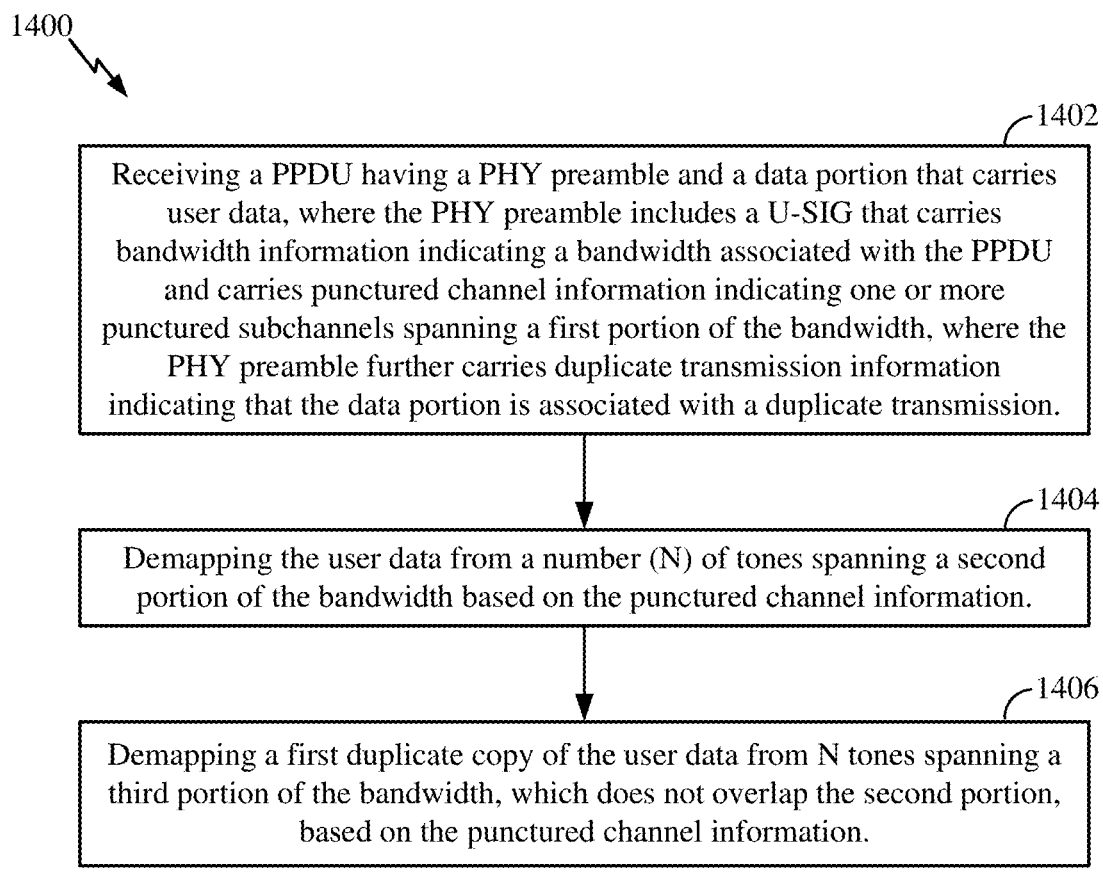
FIG. 14 shows a flowchart illustrating an example process for wireless communication that supports duplicate transmissions with channel puncturing according to some implementations.

FIG. 14 shows a flowchart illustrating an example process 1400 for wireless communication that supports duplicate transmissions with channel puncturing according to some implementations. In some implementations, the process 1400 may be performed by a wireless communication device operating as or within an AP, such as one of the APs 102 or 502 described above with reference to FIGS. 1 and 5A, respectively. In some other implementations, the process 1400 may be performed by a wireless communication device operating as or within a network node, such as one of the STAs 104 or 504 described above with reference to FIGS. 1 and 5B, respectively.

In some aspects, the first portion of the bandwidth may overlap a subset of the N tones spanning the second portion of the bandwidth. In some implementations, the subset may include a respective range of tones spanned by each of the one or more punctured subchannels in addition to two tones immediately below, or three tones immediately above, each of the ranges. In some implementations, the N tones spanning the second portion of the bandwidth may represent a first RU and the N tones spanning the third portion of the bandwidth may represent a second RU, where the user data is demapped from the first RU in accordance with a DCM scheme and the first duplicate copy of the user data is demapped from the second RU in accordance with the DCM scheme. In some implementations, LLRs may be calculated for each bit of the user data received on the N tones, where the LLRs associated with each tone in the subset of tones overlapping the first portion of the bandwidth are assigned a value equal to zero.

In some other aspects, the first portion of the bandwidth may not overlap any of the second or third portions of the bandwidth. In some implementations, the N tones spanning the second portion of the bandwidth may represent a first RU or MRU and the N tones spanning the third portion of the bandwidth may represent a second RU or MRU, where the user data is demapped from the first RU or MRU in accordance with a DCM scheme and the first duplicate copy of the user data is demapped from the second RU or MRU in accordance with the DCM scheme.

In some other implementations, the N tones spanning the second portion of the bandwidth may represent a first RU and the N tones spanning the third portion of the bandwidth may represent a second RU. In such implementations, a second duplicate copy of the user data may be demapped from N tones spanning a third RU that does not overlap the first portion of the bandwidth or any of the first or second RUs. In some implementations, the user data may be demapped from the first RU in accordance with a DCM scheme and the first and second duplicate copies of the user data may be demapped from the second and third RUs, respectively, in accordance with the DCM scheme.

In some implementations, a third duplicate copy of the user data may be demapped from N tones spanning a fourth RU that does not overlap the first portion of the bandwidth or any of the first, second, or third RUs; and a fourth duplicate copy of the user data may be demapped from N tones spanning a fifth RU that does not overlap the first portion of the bandwidth or any of the first, second, third, or fourth RUs. In some implementations, the user data may be demapped from the first RU in accordance with a DCM scheme and the first, second, third, and fourth duplicate copies of the user data may be demapped from the second, third, fourth, and fifth RUs, respectively, in accordance with the DCM scheme.

Figure 15:
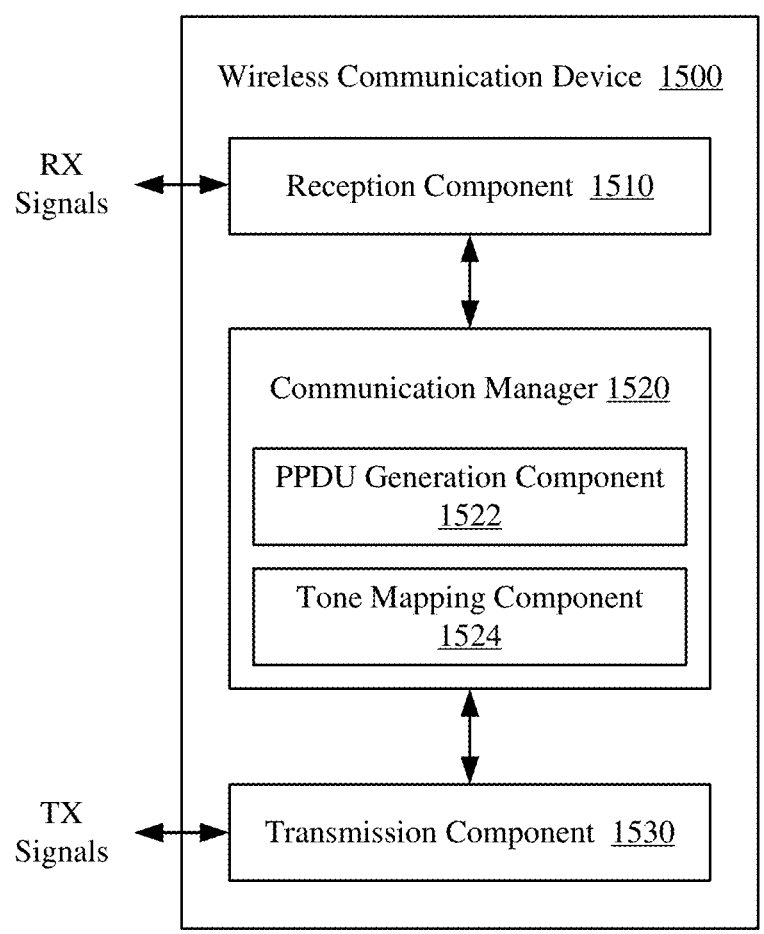
FIG. 15 shows a block diagram of an example wireless communication device according to some implementations.

FIG. 15 shows a block diagram of an example wireless communication device 1500 according to some implementations. In some implementations, the wireless communication device 1500 is configured to perform the processes 1300 described above with reference to FIG. 13. The wireless communication device 1500 can be an example implementation of the wireless communication device 400 described above with reference to FIG. 4. For example, the wireless communication device 1500 can be a chip, SoC, chipset, package or device that includes at least one processor and at least one modem (for example, a Wi-Fi (IEEE 802.11) modem or a cellular modem).

The wireless communication device 1500 includes a reception component 1510, a communication manager 1520, and a transmission component 1530. The communication manager 1520 further includes a PPDU generation component 1522 and a tone mapping component 1524. Portions of one or more of the components 1522 and 1524 may be implemented at least in part in hardware or firmware. In some implementations, at least some of the components 1522 or 1524 are implemented at least in part as software stored in a memory (such as the memory 408). For example, portions of one or more of the components 1522 and 1524 can be implemented as non-transitory instructions (or "code") executable by a processor (such as the processor 406) to perform the functions or operations of the respective component.

The reception component 1510 is configured to receive RX signals, over a wireless channel, from one or more other wireless communication devices. The communication manager 1520 is configured to control or manage communications with the one or more other wireless communication devices. In some implementations, the PPDU generation component 1522 may generate a PPDU having a PHY preamble and a data portion that carries user data, where the PHY preamble includes a U-SIG that carries bandwidth information indicating a bandwidth associated with the PPDU and carries punctured channel information indicating one or more punctured subchannels spanning a first portion of the bandwidth, and where the PHY preamble further carries duplicate transmission information indicating that the data portion is associated with a duplicate transmission; and the tone mapping component 1524 may map the user data to a number (N) of tones spanning a second portion of the bandwidth, and map a first duplicate copy of the user data to N tones spanning a third portion of the bandwidth that does not overlap the second portion. The transmission component 1530 is configured to transmit TX signals, over the wireless channel, to one or more other wireless communication devices. In some implementations, the transmission component 1530 may transmit the PPDU over a wireless channel that spans the bandwidth indicated by the bandwidth information excluding the one or more punctured subchannels.

Figure 16:
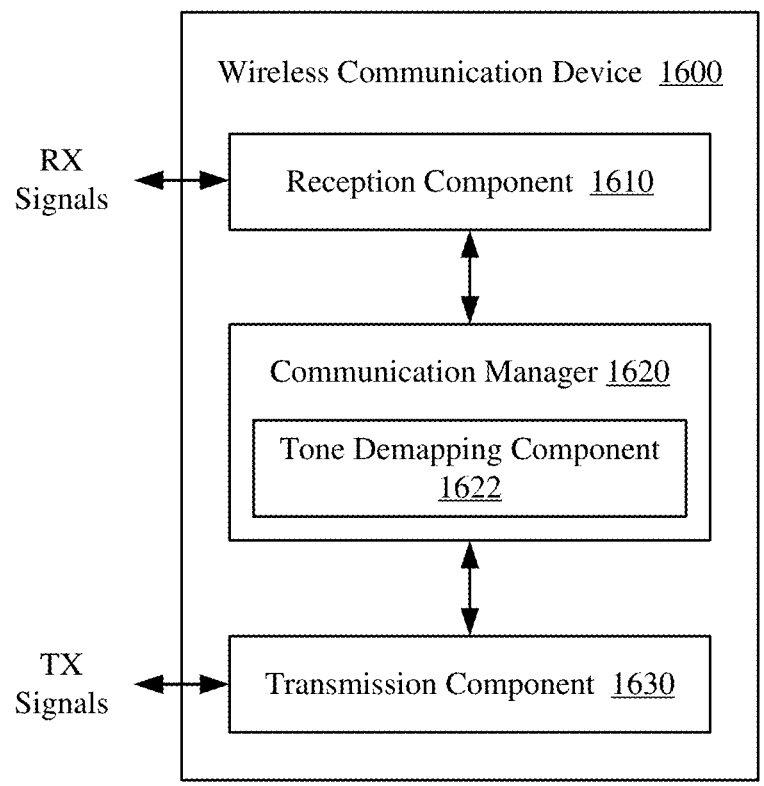
FIG. 16 shows a block diagram of an example wireless communication device according to some implementations.

FIG. 16 shows a block diagram of an example wireless communication device 1600 according to some implementations. In some implementations, the wireless communication device 1600 is configured to perform any of the processes 1400 described above with reference to FIG. 14. The wireless communication device 1600 can be an example implementation of the wireless communication device 400 described above with reference to FIG. 4. For example, the wireless communication device 1600 can be a chip, SoC, chipset, package or device that includes at least one processor and at least one modem (for example, a Wi-Fi (IEEE 802.11) modem or a cellular modem).

The wireless communication device 1600 includes a reception component 1610, a communication manager 1620, and a transmission component 1630. The communication manager 1620 further includes a tone demapping component 1622. Portions of the tone demapping component 1622 may be implemented at least in part in hardware or firmware. In some implementations, the tone demapping component 1622 may be implemented at least in part as software stored in a memory (such as the memory 408). For example, portions of the tone demapping component 1622 can be implemented as non-transitory instructions (or "code") executable by a processor (such as the processor 406) to perform the functions or operations of the respective component.

The reception component 1610 is configured to receive RX signals, over a wireless channel, from one or more other wireless communication devices. In some implementations, the reception component 1610 may receive a PPDU having a PHY preamble and a data portion that carries user data, where the PHY preamble includes a U-SIG that carries bandwidth information indicating a bandwidth associated with the PPDU and carries punctured channel information indicating one or more punctured subchannels spanning a first portion of the bandwidth, and where the PHY preamble further carries duplicate transmission information indicating that the data portion is associated with a duplicate transmission. The communication manager 1620 is configured to control or manage communications with the one or more other wireless communication devices. In some implementations, the tone demapping component 1622 may demap the user data from a number (N) of tones spanning a second portion of the bandwidth based on the punctured channel information, and demap a first duplicate copy of the user data from N tones spanning a third portion of the bandwidth, which does not overlap the second portion, based on the punctured channel information. The transmission component 1630 is configured to transmit TX signals, over the wireless channel, to one or more other wireless communication devices.

Implementation examples are described in the following numbered clauses:

1. A method for wireless communication by a wireless communication device, including:
    generating a physical layer (PHY) convergence protocol (PLCP) protocol data unit (PPDU) having a PHY preamble and a data portion that carries user data, the PHY preamble including a universal signal field (U-SIG) that carries bandwidth information indicating a bandwidth associated with the PPDU and carries punctured channel information indicating one or more punctured subchannels spanning a first portion of the bandwidth, the PHY preamble further carrying duplicate transmission information indicating that the data portion is associated with a duplicate transmission;
    mapping the user data to a number (N) of tones spanning a second portion of the bandwidth;

mapping a first duplicate copy of the user data to N tones spanning a third portion of the bandwidth that does not overlap the second portion; and transmitting the PPDU over a wireless channel that spans the bandwidth indicated by the bandwidth information excluding the one or more punctured subchannels.

2. The method of clause 1, where the first portion of the bandwidth overlaps a subset of the N tones spanning the second portion of the bandwidth.

3. The method of any of clauses 1 or 2, where the subset includes a respective range of tones spanned by each of the one or more punctured subchannels in addition to two tones immediately below, or three tones immediately above, each of the ranges.

4. The method of any of clauses 1-3, where the N tones spanning the second portion of the bandwidth represent a first resource unit (RU), in which the subset of tones overlapping the first portion of the bandwidth are not modulated for transmission over the wireless channel, and the N tones spanning the third portion of the bandwidth represent a second RU, the user data being mapped to the first RU in accordance with a dual carrier modulation (DCM) scheme and the first duplicate copy of the user data being mapped to the second RU in accordance with the DCM scheme.

5. The method of clause 1, where the first portion of the bandwidth does not overlap any of the second or third portions of the bandwidth.

6. The method of any of clauses 1 or 5, where the N tones spanning the second portion of the bandwidth represent a first RU or multiple-RU (MRU) and the N tones spanning the third portion of the bandwidth represent a second RU or MRU, the user data being mapped to the first RU or MRU in accordance with a DCM scheme and the first duplicate copy of the user data being mapped to the second RU or MRU in accordance with the DCM scheme.

7. The method of any of clauses 1 or 5, where the N tones spanning the second portion of the bandwidth represent a first RU and the N tones spanning the third portion of the bandwidth represent a second RU, the method further including:

mapping a second duplicate copy of the user data to N tones spanning a third RU that does not overlap the first portion of the bandwidth or any of the first or second RUs.

8. The method of any of clauses 1, 5, or 7, where the user data is mapped to the first RU in accordance with a DCM scheme and the first and second duplicate copies of the user data are mapped to the second and third RUs, respectively, in accordance with the DCM scheme.

9. The method of any of clauses 1, 5, 7, or 8, further including:

mapping a third duplicate copy of the user data to N tones spanning a fourth RU that does not overlap the first portion of the bandwidth or any of the first, second, or third RUs; and mapping a fourth duplicate copy of the user data to N tones spanning a fifth RU that does not overlap the first portion of the bandwidth or any of the first, second, third, or fourth RUs.

10. The method of any of clauses 1, 5, or 7-9, where the user data is mapped to the first RU in accordance with a DCM scheme and the first, second, third, and fourth duplicate copies of the user data are mapped to the second, third, fourth, and fifth RUs, respectively, in accordance with the DCM scheme.

11. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 1-10.

12. A method for wireless communication performed by a wireless communication device, including:

receiving a physical layer (PHY) convergence protocol (PLCP) protocol data unit (PPDU) having a PHY preamble and a data portion that carries user data, the PHY preamble including a universal signal field (U-SIG) that carries bandwidth information indicating a bandwidth associated with the PPDU and carries punctured channel information indicating one or more punctured subchannels spanning a first portion of the bandwidth, the PHY preamble further carrying duplicate transmission information indicating that the data portion is associated with a duplicate transmission;

demapping the user data from a number (N) of tones spanning a second portion of the bandwidth based on the punctured channel information; and demapping a first duplicate copy of the user data from N tones spanning a third portion of the bandwidth, which does not overlap the second portion, based on the punctured channel information.

13. The method of clause 12, where the first portion of the bandwidth overlaps a subset of the N tones spanning the second portion of the bandwidth.

14. The method of any of clauses 12 or 13, where the subset includes a respective range of tones spanned by each of the one or more punctured subchannels in addition to two tones immediately below, or three tones immediately above, each of the ranges.

15. The method of any of clauses 12-14, where the N tones spanning the second portion of the bandwidth represent a first resource unit (RU) and the N tones spanning the third portion of the bandwidth represent a second RU, the user data being demapped from the first RU in accordance with a dual carrier modulation (DCM) scheme and the first duplicate copy of the user data being demapped from the second RU in accordance with the DCM scheme.

16. The method of any of clauses 12-15, where the demapping of the user data from the N tones spanning the second portion of the bandwidth includes:

calculating log-likelihood ratios (LLRs) for each bit of the user data received on the N tones, the LLRs associated with each tone in the subset of tones overlapping the first portion of the bandwidth being assigned a value equal to zero.

17. The method of clause 12, where the first portion of the bandwidth does not overlap any of the second or third portions of the bandwidth.

18. The method of any of clauses 12 or 17, where the N tones spanning the second portion of the bandwidth represent a first RU or multiple-RU (MRU) and the N tones spanning the third portion of the bandwidth represent a second RU or MRU, the user data being demapped from the first RU or MRU in accordance with a DCM scheme and the first duplicate copy of the user data being demapped from the second RU or MRU in accordance with the DCM scheme.
19. The method of any of clauses 12 or 17, where the N tones spanning the second portion of the bandwidth represent a first RU and the N tones spanning the third portion of the bandwidth represent a second RU, the method further including:
demapping a second duplicate copy of the user data from N tones spanning a third RU that does not overlap the first portion of the bandwidth or any of the first or second RUs.
20. The method of any of clauses 12, 17, or 19, where the user data is demapped from the first RU in accordance with a DCM scheme and the first and second duplicate copies of the user data are demapped from the second and third RUs, respectively, in accordance with the DCM scheme.
21. The method of any of clauses 12, 17, 19, or 20, further including:
demapping a third duplicate copy of the user data from N tones spanning a fourth RU that does not overlap the first portion of the bandwidth or any of the first, second, or third RUs; and
demapping a fourth duplicate copy of the user data from N tones spanning a fifth RU that does not overlap the first portion of the bandwidth or any of the first, second, third, or fourth RUs.
22. The method of any of clauses 12, 17, or 19-21, where the user data is demapped from the first RU in accordance with a DCM scheme and the first, second, third, and fourth duplicate copies of the user data are demapped from the second, third, fourth, and fifth RUs, respectively, in accordance with the DCM scheme.
23. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 12-22.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:
1. A method for wireless communication performed by a wireless communication device, comprising:
generating a physical layer (PHY) convergence protocol (PLCP) protocol data unit (PPDU) having a PHY preamble and a data portion that carries user data, the PHY preamble including a universal signal field (U-SIG) that carries bandwidth information indicating a bandwidth associated with the PPDU and carries punctured channel information indicating one or more punctured subchannels spanning a first portion of the bandwidth, the PHY preamble further carrying duplicate transmission information indicating that the data portion is associated with a duplicate transmission;
mapping the user data to a number (N) of tones spanning a second portion of the bandwidth;
mapping a first duplicate copy of the user data to N tones spanning a third portion of the bandwidth that does not overlap the second portion; and
transmitting the PPDU over a wireless channel that spans the bandwidth indicated by the bandwidth information excluding the one or more punctured subchannels.
2. The method of claim 1, wherein the first portion of the bandwidth overlaps a subset of the N tones spanning the second portion of the bandwidth.
3. The method of claim 2, wherein the subset includes a respective range of tones spanned by each of the one or more punctured subchannels in addition to two tones immediately below, or three tones immediately above, each of the ranges.

4. The method of claim 2, wherein the N tones spanning the second portion of the bandwidth represent a first resource unit (RU), in which the subset of tones overlapping the first portion of the bandwidth are not modulated for transmission over the wireless channel, and the N tones spanning the third portion of the bandwidth represent a second RU, the user data (x) being mapped to the first RU in accordance with a dual carrier modulation (DCM) scheme that produces a frequency-domain signal [x, $x_{DCM}$], where $x_{DCM}(k)=(-1)^{k+N}*x(k)$ for k=[0, 1, . . . , N−1], and the first duplicate copy of the user data x being mapped to the second RU in accordance with the DCM scheme.

5. The method of claim 1, wherein the first portion of the bandwidth does not overlap any of the second or third portions of the bandwidth.

6. The method of claim 5, wherein the N tones spanning the second portion of the bandwidth represent a first RU or multiple-RU (MRU) and the N tones spanning the third portion of the bandwidth represent a second RU or MRU, the user data (x) being mapped to the first RU or MRU in accordance with a DCM scheme that produces a frequency-domain signal [x, $x_{DCM}$], where $x_{DCM}(k)=(-1)^{k+N}*x(k)$ for k=[0, 1, . . . , N−1], and the first duplicate copy of the user data being mapped to the second RU or MRU in accordance with the DCM scheme.

7. The method of claim 5, wherein the N tones spanning the second portion of the bandwidth represent a first RU and the N tones spanning the third portion of the bandwidth represent a second RU, the method further comprising:
mapping a second duplicate copy of the user data to N tones spanning a third RU that does not overlap the first portion of the bandwidth or any of the first or second RUs.

8. The method of claim 7, wherein the user data is mapped to the first RU in accordance with a DCM scheme and the first and second duplicate copies of the user data are mapped to the second and third RUs, respectively, in accordance with the DCM scheme.

9. The method of claim 7, further comprising:
mapping a third duplicate copy of the user data to N tones spanning a fourth RU that does not overlap the first portion of the bandwidth or any of the first, second, or third RUs; and
mapping a fourth duplicate copy of the user data to N tones spanning a fifth RU that does not overlap the first portion of the bandwidth or any of the first, second, third, or fourth RUs.

10. The method of claim 9, wherein the user data is mapped to the first RU in accordance with a DCM scheme and the first, second, third, and fourth duplicate copies of the user data are mapped to the second, third, fourth, and fifth RUs, respectively, in accordance with the DCM scheme.

11. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
generate a physical layer (PHY) convergence protocol (PLCP) protocol data unit (PPDU) having a PHY preamble and a data portion that carries user data, the PHY preamble including a universal signal field (U-SIG) that carries bandwidth information indicating a bandwidth spanning a first portion of the PPDU and carries punctured channel information indicating one or more punctured subchannels associated with the bandwidth, the PHY preamble further carrying duplicate transmission information indicating that the data portion is associated with a duplicate transmission;
map the user data to a number (N) of tones spanning a second portion of the bandwidth;
map a first duplicate copy of the user data to N tones spanning a third portion of the bandwidth that does not overlap the second portion; and
transmit the PPDU over a wireless channel that spans the bandwidth indicated by the bandwidth information excluding the one or more punctured subchannels.

12. The wireless communication device of claim 11, wherein the first portion of the bandwidth overlaps a subset of the N tones spanning the second portion of the bandwidth, the N tones spanning the second portion of the bandwidth representing a first resource unit (RU), in which the subset of tones overlapping the first portion of the bandwidth are not modulated for transmission over the wireless channel, and the N tones spanning the third portion of the bandwidth representing a second RU, the user data being mapped to the first RU in accordance with a dual carrier modulation (DCM) scheme and the first duplicate copy of the user data being mapped to the second RU in accordance with the DCM scheme.

13. The wireless communication device of claim 11, wherein the first portion of the bandwidth does not overlap any of the second or third portions of the bandwidth, the N tones spanning the second portion of the bandwidth representing a first RU or multiple-RU (MRU) and the N tones spanning the third portion of the bandwidth representing a second RU or MRU, the user data being mapped to the first RU or MRU in accordance with a DCM scheme and the first duplicate copy of the user data being mapped to the second RU or MRU in accordance with the DCM scheme.

14. The wireless communication device of claim 11, wherein the first portion of the bandwidth does not overlap any of the second or third portions of the bandwidth, the N tones spanning the second portion of the bandwidth representing a first RU and the N tones spanning the third portion of the bandwidth representing a second RU, execution of the processor-readable code being further configured to:
map a second duplicate copy of the user data to N tones spanning a third RU that does not overlap the first portion of the bandwidth or any of the first or second RUs.

15. A method for wireless communication performed by a wireless communication device, comprising:
receiving a physical layer (PHY) convergence protocol (PLCP) protocol data unit (PPDU) having a PHY preamble and a data portion that carries user data, the PHY preamble including a universal signal field (U-SIG) that carries bandwidth information indicating a bandwidth associated with the PPDU and carries punctured channel information indicating one or more punctured subchannels spanning a first portion of the bandwidth, the PHY preamble further carrying duplicate transmission information indicating that the data portion is associated with a duplicate transmission;
demapping the user data from a number (N) of tones spanning a second portion of the bandwidth based on the punctured channel information; and
demapping a first duplicate copy of the user data from N tones spanning a third portion of the bandwidth, which does not overlap the second portion, based on the punctured channel information.

16. The method of claim 15, wherein the first portion of the bandwidth overlaps a subset of the N tones spanning the second portion of the bandwidth.

17. The method of claim 16, wherein the subset includes a respective range of tones spanned by each of the one or more punctured subchannels in addition to two tones immediately below, or three tones immediately above, each of the ranges.

18. The method of claim 16, wherein the N tones spanning the second portion of the bandwidth represent a first resource unit (RU) and the N tones spanning the third portion of the bandwidth represent a second RU, the user data being demapped from the first RU in accordance with a dual carrier modulation (DCM) scheme and the first duplicate copy of the user data being demapped from the second RU in accordance with the DCM scheme.

19. The method of claim 16, wherein the demapping of the user data from the N tones spanning the second portion of the bandwidth comprises:
calculating log-likelihood ratios (LLRs) for each bit of the user data received on the N tones, the LLRs associated with each tone in the subset of tones overlapping the first portion of the bandwidth being assigned a value equal to zero.

20. The method of claim 15, wherein the first portion of the bandwidth does not overlap any of the second or third portions of the bandwidth.

21. The method of claim 20, wherein the N tones spanning the second portion of the bandwidth represent a first RU or multiple-RU (MRU) and the N tones spanning the third portion of the bandwidth represent a second RU or MRU, the user data being demapped from the first RU or MRU in accordance with a DCM scheme and the first duplicate copy of the user data being demapped from the second RU or MRU in accordance with the DCM scheme.

22. The method of claim 20, wherein the N tones spanning the second portion of the bandwidth represent a first RU and the N tones spanning the third portion of the bandwidth represent a second RU, the method further comprising:
demapping a second duplicate copy of the user data from N tones spanning a third RU that does not overlap the first portion of the bandwidth or any of the first or second RUs.

23. The method of claim 22, wherein the user data is demapped from the first RU in accordance with a DCM scheme and the first and second duplicate copies of the user data are demapped from the second and third RUs, respectively, in accordance with the DCM scheme.

24. The method of claim 22, further comprising:
demapping a third duplicate copy of the user data from N tones spanning a fourth RU that does not overlap the first portion of the bandwidth or any of the first, second, or third RUs; and
demapping a fourth duplicate copy of the user data from N tones spanning a fifth RU that does not overlap the first portion of the bandwidth or any of the first, second, third, or fourth RUs.

25. The method of claim 24, wherein the user data is demapped from the first RU in accordance with a DCM scheme and the first, second, third, and fourth duplicate copies of the user data are demapped from the second, third, fourth, and fifth RUs, respectively, in accordance with the DCM scheme.

26. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive a physical layer (PHY) convergence protocol (PLCP) protocol data unit (PPDU) having a PHY preamble and a data portion that carries user data, the PHY preamble including a universal signal field (U-SIG) that carries bandwidth information indicating a bandwidth associated with the PPDU and carries punctured channel information indicating one or more punctured subchannels spanning a first portion of the bandwidth, the PHY preamble further carrying duplicate transmission information indicating that the data portion is associated with a duplicate transmission;
demap the user data from a number (N) of tones spanning a second portion of the bandwidth based on the punctured channel information; and
demap a first duplicate copy of the user data from N tones spanning a third portion of the bandwidth, which does not overlap the second portion, based on the punctured channel information.

27. The wireless communication device of claim 26, wherein the first portion of the bandwidth overlaps a subset of the N tones spanning the second portion of the bandwidth, the N tones spanning the second portion of the bandwidth representing a first resource unit (RU) and the N tones spanning the third portion of the bandwidth representing a second RU, the user data being demapped from the first RU in accordance with a dual carrier modulation (DCM) scheme and the first duplicate copy of the user data being demapped from the second RU in accordance with the DCM scheme.

28. The wireless communication device of claim 27, wherein the demapping of the user data from the N tones spanning the second portion of the bandwidth comprises:
calculating log-likelihood ratios (LLRs) for each bit of the user data received on the N tones, the LLRs associated with each tone in the subset of tones overlapping the first portion of the bandwidth being assigned a value equal to zero.

29. The wireless communication device of claim 26, wherein the first portion of the bandwidth does not overlap any of the second or third portions of the bandwidth, the N tones spanning the second portion of the bandwidth representing a first RU or multiple-RU (MRU) and the N tones spanning the third portion of the bandwidth representing a second RU or MRU, the user data being demapped from the first RU or MRU in accordance with a DCM scheme and the first duplicate copy of the user data being demapped from the second RU or MRU in accordance with the DCM scheme.

30. The wireless communication device of claim 26, wherein the first portion of the bandwidth does not overlap any of the second or third portions of the bandwidth, the N tones spanning the second portion of the bandwidth representing a first RU and the N tones spanning the third portion of the bandwidth representing a second RU, execution of the processor-readable code being further configured to:
demap a second duplicate copy of the user data from N tones spanning a third RU that does not overlap the first portion of the bandwidth or any of the first or second RUs.

31. The method of claim 4, further comprising:

applying phase rotations [a(1), a(2)] to the frequency-domain signal [x, $x_{DCM}$] mapped to the first RU; and applying phase rotations [a(3), a(4)] to the frequency-domain signal [x, $x_{DCM}$] mapped to the second RU, where at least one of a(1), a(2), a(3), or a(4) is equal to 1 and at least one of a(1), a(2), a(3), or a(4) is equal to −1.

32. The method of claim 6, further comprising:

applying phase rotations [a(1), a(2)] to the frequency-domain signal [x, $x_{DCM}$] mapped to the first RU or MRU; and applying phase rotations [a(3), a(4)] to the frequency-domain signal [x, $x_{DCM}$] mapped to the second RU or MRU, where at least one of a(1), a(2), a(3), or a(4) is equal to 1 and at least one of a(1), a(2), a(3), or a(4) is equal to −1.

* * * * *